(12) United States Patent
Vasylyev

(10) Patent No.: US 8,740,397 B2
(45) Date of Patent: Jun. 3, 2014

(54) OPTICAL COVER EMPLOYING MICROSTRUCTURED SURFACES

(75) Inventor: Sergiy Victorovich Vasylyev, Elk Grove, CA (US)

(73) Assignee: SVV Technology Innovations, Inc., Sacramento, CA (US)

( * ) Notice: Subject to any disclaimer, the term of this patent is extended or adjusted under 35 U.S.C. 154(b) by 155 days.

(21) Appl. No.: 13/351,800

(22) Filed: Jan. 17, 2012

(65) Prior Publication Data

US 2012/0182615 A1    Jul. 19, 2012

Related U.S. Application Data

(60) Provisional application No. 61/461,522, filed on Jan. 18, 2011.

(51) Int. Cl.
*G02B 5/124*    (2006.01)

(52) U.S. Cl.
USPC ......................................................... 359/530

(58) Field of Classification Search
CPC ....................................................... G02B 5/124
USPC ................................................. 359/529, 530
See application file for complete search history.

(56) References Cited

U.S. PATENT DOCUMENTS

| | | | |
|---|---|---|---|
| 5,975,706 A * | 11/1999 | Nakayama | 359/530 |
| 6,064,452 A * | 5/2000 | Ogino | 349/57 |
| 6,274,860 B1 | 8/2001 | Rosenberg | |
| 6,333,458 B1 | 12/2001 | Forrest et al. | |
| 6,440,769 B2 | 8/2002 | Peumans et al. | |
| 7,672,549 B2 | 3/2010 | Ghosh et al. | |
| 7,817,885 B1 | 10/2010 | Moore et al. | |
| 2004/0103938 A1 | 6/2004 | Rider | |
| 2008/0264483 A1 | 10/2008 | Keshner et al. | |
| 2009/0126792 A1 | 5/2009 | Gruhlke et al. | |
| 2010/0186798 A1 | 7/2010 | Tormen et al. | |
| 2010/0278480 A1 | 11/2010 | Vasylyev | |
| 2011/0226332 A1 | 9/2011 | Ford et al. | |
| 2012/0012741 A1 | 1/2012 | Vasylyev | |

* cited by examiner

*Primary Examiner* — Euncha Cherry

(57) ABSTRACT

A light trapping optical cover employing an optically transparent layer is described. The transparent layer has at least one corrugated surface formed by a plurality of isosceles right-angle prismatic corrugations configured to internally retroreflect light into the transparent layer. The corrugated surface also includes optical windows configured for inputting or outputting light to or from the transparent layer. The optical cover may further employ a focusing array of light collectors being pairwise associated with the respective optical windows.

19 Claims, 14 Drawing Sheets

OPTICAL COVER EMPLOYING MICROSTRUCTURED SURFACES

CROSS-REFERENCE TO RELATED APPLICATIONS

This application claims priority from U.S. provisional application Ser. No. 61/461,522 filed on Jan. 18, 2011, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

The present invention relates to a device and method for enhancing the light trapping in light harvesting devices. Particularly, the present invention relates to collecting light from a large surface area of the light harvesting device comprising a light absorbing material and trapping the light within the device so as to increase the optical path through the light absorbing material and improve the useful light absorption. More particularly, the present invention relates to enhancing the light trapping in photovoltaic solar panels, light detectors, day lighting systems, bioreactors, water light-treatment reactors, and the like. The present invention also relates to illumination devices, particularly to light emitting panels and conduits.

2. Description of Background Art

Many light harvesting devices employ a light-absorbing active layer that has at least a partial transparency with respect to the incident light or absorbs more weakly in certain wavelengths than in the others. Conventionally, the absorption in such devices can be improved by increasing the thickness of the active layer. However, this results in the increased system dimensions, material consumption, weight and cost. Alternatively, light trapping approaches are well known in which the light path is altered within the device by micro-texturing one or more device surfaces. While this allows to somewhat increase the light path and thus improve absorption compared to a non-textured device, a significant portion of the light still escapes from the device without being fully absorbed. It is therefore an object of this invention to provide an improved optical structure that can be used in conjunction with light harvesting devices and that can provide efficient light trapping with minimal energy loss.

The present invention solves the above problems by providing a transparent optical cover structure having one or more micro-structured surfaces that allow for trapping the incident light within the light harvesting device by means of at least TIR and cause the multiple passage of the trapped light through the active layer thus improving the light absorbtion and device efficiency at the minimum consumption of active layer's material.

Many light emitting devices employing panel-like structures, such as lighting panels or backlights designed to distribute light along the surface of the panel and emit light from one or more broad surfaces of the panel, are limited to conducting light propagating at relatively high TIR angles with respect to a normal to the panel surface. Furthermore, many such light emitting devices employ light extracting features that impair the optical transparency of the device or/and involve additional fabrication steps or materials, such as selective surface metallization or using, adding reflectors which increases system complexity and cost.

The present invention solves these problems by providing a transparent optical cover structure having one or more micro-structured surfaces that allow for light propagation along the panel in a greater angular range and provide for an efficient light distribution and extraction mechanism.

Other objects and advantages of this invention will be apparent to those skilled in the art from the following disclosure.

BRIEF SUMMARY OF THE INVENTION

The present invention solves a number of light distribution and/or harvesting problems within a compact optical cover utilizing an efficient light trapping mechanism. An optically transparent layer is provided which can be associated with an opposing reflective surface and form a waveguiding structure. The transparent layer employs a corrugated surface with retroreflective surface corrugations for confining light below the surface and further employs optical windows for inputting or outputting light to or from the layer. The optical cover may optionally include a collector array for collecting light onto the optical windows or collimating light emanated from the optical windows. Various light harvesting or light emitting devices may be associated with the optical cover of this invention.

In at least one embodiment, the present invention describes an optical cover which traps light by means of retroreflection from isosceles right-angle surface corrugations and propagates light along its prevailing plane by means of at least a total internal reflection (TIR).

The optical cover includes a layer of optically transparent material having a broad corrugated surface and an opposing surface extending generally parallel to the corrugated surface. The corrugated surface employs a plurality of surface corrugations which may be formed by right-angle isosceles prisms having a common longitudinal axis extending parallel to a reference line in the surface plane. Each surface corrugation is configured to retroreflect light propagating in the transparent layer within an acceptance angle with respect to a surface normal. The corrugated surface further employs a plurality of optical windows being surface portions that are either free of the surface corrugations or where the corrugated relief is suppressed.

The optical cover can operate in response to light received on the optical windows and injected into the transparent layer. At least a substantial portion of light received by the apertures of optical windows is trapped underneath the corrugated surface by retroreflection from the surface corrugations. The trapped light can propagate along the prevailing plane of the layer by bouncing between the corrugated surface and any opposing reflective surface that may be positioned below the layer. When a light harvesting device is provided between the corrugated surface and the reflective surface, the useful absorption of light by the device may be improved. Also, when a suitable light emitting device is provided between the corrugated surface and the reflective surface, light distribution and collimation may be improved.

In at least one implementation, each optical window has a surface being generally parallel to the prevailing plane of the transparent layer. In at least one implementation, the optical windows are arranged into parallel strips extending generally perpendicular to the longitudinal axis of the surface corrugations. In at least one implementation, each of the optical windows includes one or more refractive faces inclined at an angle with respect to the prevailing plane at least in a cross-section perpendicular to the longitudinal axis of the surface corrugations.

In alternative implementations, the optical windows may include various surface relief features which can selected from the group of elements consisting of cavities, prismatic grooves, blind holes, through holes, undercuts, notches, extensions, surface discontinuities, discontinuities in said layer, surface texture, and surface corrugations. In a further alternative implementation, the optical windows may comprise cavities having a V-shape in a cross-section.

In at least one implementation, the optical cover may further comprise a plurality of light collectors disposed in energy exchange relationship with the optical windows. In at least one implementation, the optical cover may further comprise a lens array having a focal plane disposed in an immediate proximity of the corrugated surface. In at least one implementation, the lens array has a shape in a longitudinal section selected from the group of elements consisting of elongated, cylindrical, square, rectangular and hexagonal.

In various implementations, the optical cover may be associated with other devices or surfaces. In at least one implementation, the optical cover may further comprise one or more light harvesting devices disposed on an opposing side of the transparent layer with respect to the corrugated surface. In at least one implementation, each of the light harvesting devices is selected from the group of elements consisting of one or more photovoltaic cells, radiation detectors, light absorbers, photo-chemical reactors and photo-bioreactors. In at least one implementation, the optical cover further comprises one or more light sources disposed below the prevailing plane of the transparent layer with respect to the corrugated surface. In at least one implementation, the optical cover further comprises a reflective surfaces disposed below the prevailing plane of the transparent layer with respect to the corrugated surface. In at least one implementation, the reflective surface comprises isosceles surface corrugations extending parallel to the longitudinal axis of the corrugations of the corrugated surface. In at least one implementation, the reflective surface is a mirrored surface.

In at least one implementation, the optical cover has a form of a flexible sheet or film.

In at least one embodiment, the present invention describes an optical article comprising a layer of optically transparent material. The optically transparent layer has at least one broad corrugated surface formed by right-angle isosceles corrugations. The corrugations have retroreflective properties at least in one plane and include one or more openings configured for unimpeded communication of light into or from the transparent layer.

The present invention provides a number of beneficial elements which can be implemented either separately or in any desired combination without departing from the present teachings.

An element of the invention is an apparatus for collecting light over a given area where such light is traveling in a generally transversal direction with respect to the light collection area.

Another element of the invention is an apparatus for distributing light over a given area and emitting it along a transversal direction with respect to the prevailing plane of the light distribution area.

Another element of the invention is the inclusion of an optically transparent layer having at least one corrugated surface configured for retroreflection of at least some light propagating in the layer.

Another element of the invention is the inclusion of openings or optical windows in the corrugations that form the corrugated surface.

Another element of the invention is the use of light collecting elements that can either collect and focus incident light onto the respective openings or optical windows or, conversely, collimate light emanated by the respective openings or optical windows.

Another element of the invention is the use of various profiles for the openings or optical windows that allow for more efficient light coupling to or from the transparent layer.

Another element of the invention is the use of an additional reflective surface that opposes the corrugated surface and providing waveguiding function to the optical cover.

Another element of the invention is an optical cover configured with an attached optically responsive device (e.g., photovoltaic cell or photo reactor) or a light emitting device (e.g., light emitting diode or fluorescent lamp).

Further elements of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in the preceding figures. It will be appreciated that the apparatus may vary as to configuration and as to details of the parts without departing from the basic concepts as disclosed herein. Furthermore, elements represented in one embodiment as taught herein are applicable without limitation to other embodiments taught herein, and in combination with those embodiments and what is known in the art.

A wide range of applications exist for the present invention in relation to the collection of electromagnetic radiant energy, such as light, in a broad spectrum or any suitable spectral bands or domains. Therefore, for the sake of simplicity of expression, without limiting generality of this invention, the term "light" will be used herein although the general terms "electromagnetic energy", "electromagnetic radiation", "radiant energy" or exemplary terms like "visible light", "infrared light", or "ultraviolet light" would also be appropriate.

Figure 1:
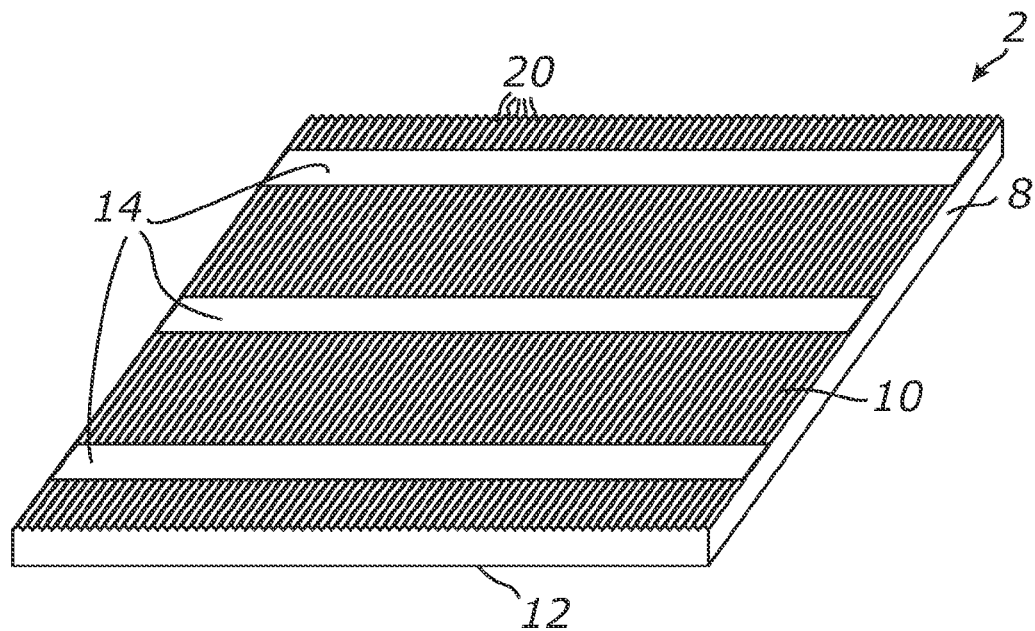
FIG. 1 is a schematic perspective view of an optical cover according to at least one embodiment of the present invention.

FIG. 1 illustrates the present invention and shows an embodiment of a light trapping optical cover 2. Optical cover 2 comprises a layer 8 of essentially transparent refractive material confined between a broad surface 10 and an opposing broad surface 12 that extends generally parallel to surface 10. Both surfaces 10 and 12 are broadly extending longitudinally and laterally so that the thickness of transparent layer 8 is substantially smaller compared to its other two dimensions.

Surface 12 is essentially smooth and transparent and is configured for a good optical transmission in either direction. Surface 10 is also essentially transparent and configured for an unimpeded light passage in at least predefined directions. Particularly, surface 10 is configured for a generally unimpeded passage of light impinging onto surface 10 from the outside of layer 10. Surface 10 is further configured to reflect rays impinging onto surface 10 from the inside of layer 8 and propagating at sufficiently low incidence angles with respect to a surface normal in at least one plane that is transversal to a prevailing plane of layer 8.

According to a preferred embodiment, surface 10 comprises a plurality of longitudinal isosceles corrugations 20 extending parallel to each other along surface 10. Each corrugation 20 is shaped as a triangular prism corner refractive reflector having two symmetrical faces disposed at approximately 90° with respect to each other and at approximately 45° with respect to a normal to surface 10. The material of transparent layer 8 should exceed $\sqrt{2}=1.414$, in which case corrugations 20 can act as retroreflectors at least for some rays propagating in layer 8.

Surface 10 further comprises a plurality of optical windows 14 which represent surface portions having different light bending properties compared to the rest of the corrugated surface. Particularly, windows 14 are preferably configured to admit light into layer 8 through their apertures without increasing the propagation angle with respect to a surface normal at least in a plane which is perpendicular to the longitudinal axis of corrugations 20. Furthermore, optical windows 14 are preferably configured to further limit light deviation from a normal to surface 10 in the above plane in order to maximize the acceptance angle of retroreflection by corrugations 20.

It will be appreciated by those skilled in the art that corrugated surface 10 will generally bend light incident into layer 8 to a higher off-normal angle in the plane perpendicular to the longitudinal axis of corrugations 20 when compared, for example, to any smooth surface portion which is void of any such corrugations. Therefore, one convenient method of limiting the off-normal angle of light entering layer 8 through windows 14 is providing a different type of surface relief than the relief associated with the corrugated portion(s) of surface 10 and which has lower or no surface slopes in the plane transversal to the corrugations. Particularly, it is preferred that the surface profile of each optical windows 14 at least in a cross-section perpendicular to the longitudinal axis of corrugations 20 is parallel to the prevailing plane or layer 8. It will be understood that, due to the parallelism of surfaces 10 and 12, the prevailing plane of layer 8 is parallel to each of the surfaces.

In the embodiment illustrated in FIG. 1, windows 14 are exemplified by openings in corrugations 20 where the surface of the openings is represented by smooth portions of surface 10 which are void of corrugations 20 so that each window 14 generally has a surface which is parallel to the prevailing plane of layer 8 in either cross-section. Each optical window 14 has an elongated rectangular aperture which longitudinal axis is extending perpendicular to corrugations 20.

A smooth surface portion of layer 8 may be characterized by a critical angle $\phi_{TIR}$ of a total internal reflection (TIR) with respect to light striking the surface from the inside of layer 8. The critical TIR angle $\phi_{TIR}$ may be found from the following expression: $\phi_{TIR}=\arcsin(n_2/n_1 \cdot \sin 90°)=\arcsin(n_2/n_1)$, where $n_1$ and $n_2$ are the refractive indices of the material of layer 8 and the outside medium, respectively. In an exemplary case of the interface between glass with the reflective index $n_1$ of about 1.51 and air with $n_2$ of about 1, $\phi_{TIR}$ is approximately equal to 41.47°. Any rays internally striking a smooth surface portion at incidence angles lower than $\phi_{TIR}$ will thus exit from layer 8 without internal reflection.

In contrast, corrugations 20 can provide retroreflection of light internally striking surface 10 at sufficiently low incidence angles with respect to a surface normal. It will further be appreciated that, corrugations 20 will retro-reflect light by means of a total internal reflection (TIR) from the respective faces when the incidence ray is within a certain acceptance angle from a surface normal. The acceptance angle varies depending on the orientation of the incidence ray with respect to the plane of surface 10 and to the longitudinal axis of corrugations 20.

An advantage of employing surface corrugations 20 is that, in order the lossless TIR to occur at surface 10, the light propagating within layer 8 need not be restricted to incidence angles greater than the critical TIR angle which may characterize the optical interface of surface 10 but may also include near-normal or even normal incidence rays which will still be internally reflected back into layer 8. However, the angle by which any ray deviates from a normal to surface 10 in a cross-section perpendicular to the longitudinal axis of corrugations 20 must be less than a predetermined maximum angle $\theta_{max}$ to prevent escaping of the light from layer 8 through surface 10. It will be appreciated that the light rays may deviate from the surface normal by any angle in a cross-section that is parallel to the longitudinal axis of corrugations 20.

It can be shown that, for right-angle isosceles corrugations 20 having a prismatic shape and refractive-reflective facets inclined at a 45° angle to the base of the respective prisms, the maximum angle $\theta_{max}$ can be found from the following relationship: $\theta_{max}=45°-\phi_{TIR}$. If $n_1$ is the refractive index of layer 8 and the surrounding medium is air, then $$\theta_{max} = 45° - \arcsin\left(\frac{1}{n_1}\right),$$

which in case of acrylic (PMMA) material gives approximately 3° and about 6° for polycarbonate (PC). Referring further to a cross-section perpendicular to the longitudinal axis of corrugations 20 and to an exemplary case when optical windows 14 of FIG. 1 having planar and smooth surfaces are used for inputting light into layer 8, it can be shown that the 3° and about 6° propagation angles within layer 8 correspond to the outside incidence angles of approximately 4° and 9° for PMMA and PC, respectively. It will be appreciated that the minimum acceptance angle in this cross-section will be higher for a higher refractive index of the material of layer 8.

The openings that form individual optical windows 14 have a smooth surface extending parallel to the prevailing plane of layer 8 and surface 10 which allows the incident light to pass through the windows in either direction. Particularly, each window 14 allows light to enter layer 8 and become trapped underneath surface 10 by means of TIR from corrugations 20.

It should be understood that the elongated-shape optical windows 14 are not limited to the perpendicular arrangement with respect to corrugations 20 and may be disposed at any other suitable angle. By way of example, FIG. 2 shows optical windows 14 extending parallel to corrugations 20.

Figure 2:
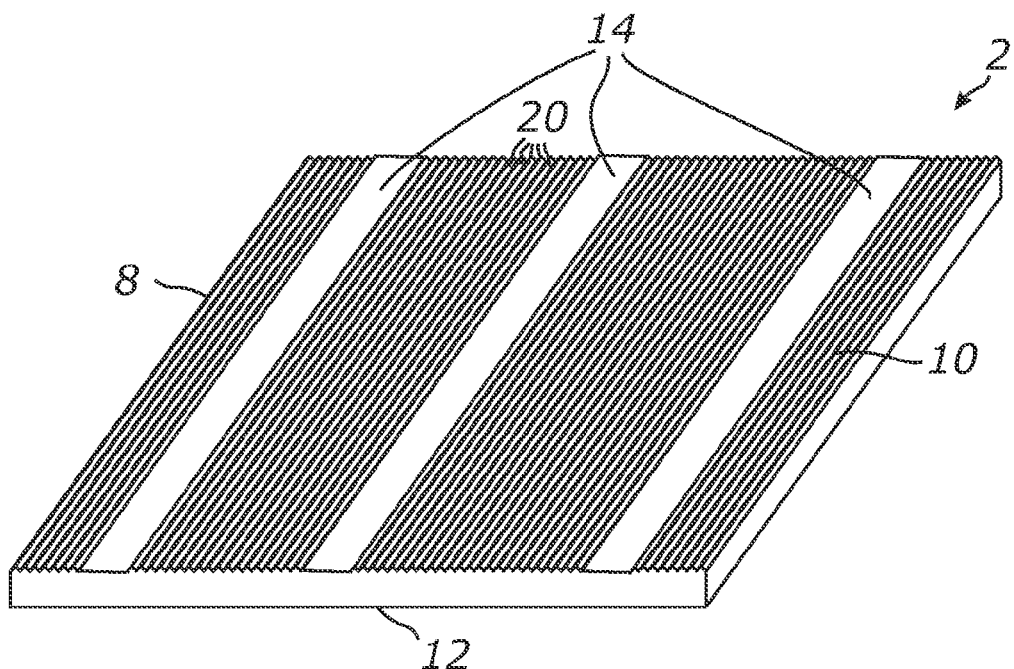
FIG. 2 is a schematic perspective view of an optical cover showing an alternative orientation of linear optical windows with respect to surface corrugations, according to at least one embodiment of the present invention.

It should also be understood that optical windows 14 may have any suitable shapes, dimensions and distribution pattern other than those illustrated in FIG. 1 and FIG. 2. By way of example and not limitations, optical windows 14 may have any two-dimensional shape and may be distributed over surface 10 in an ordered two-dimensional array of rows and columns having either a constant or variable pitch.

Figure 3:
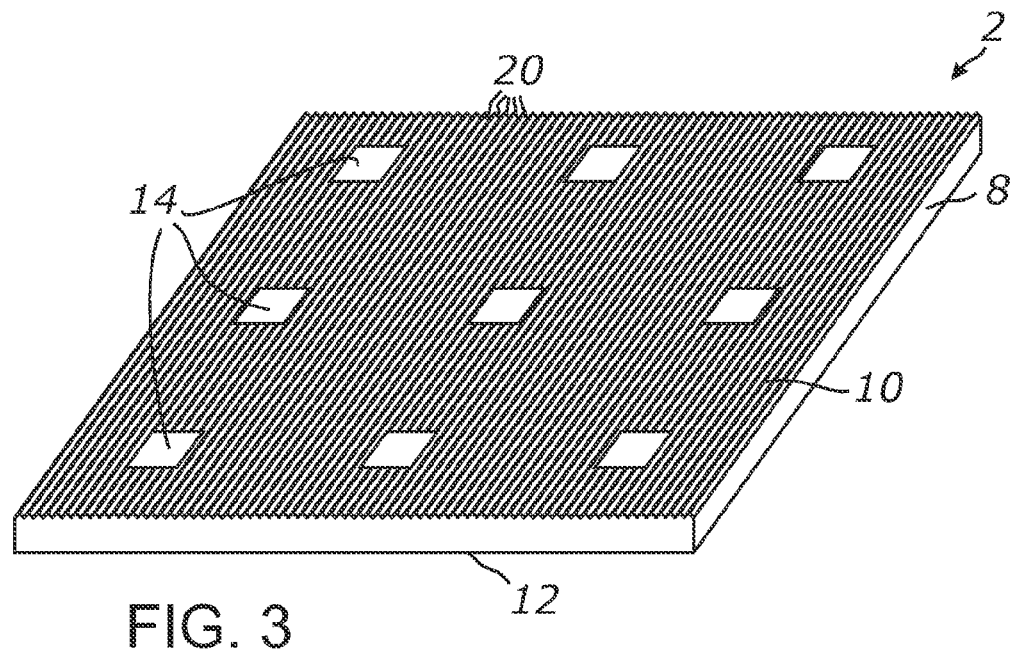
FIG. 3 is a schematic perspective view of an optical cover comprising prismatic surface corrugations and optical windows having square or rectangular apertures, according to at least one embodiment of the present invention.
Figure 4:
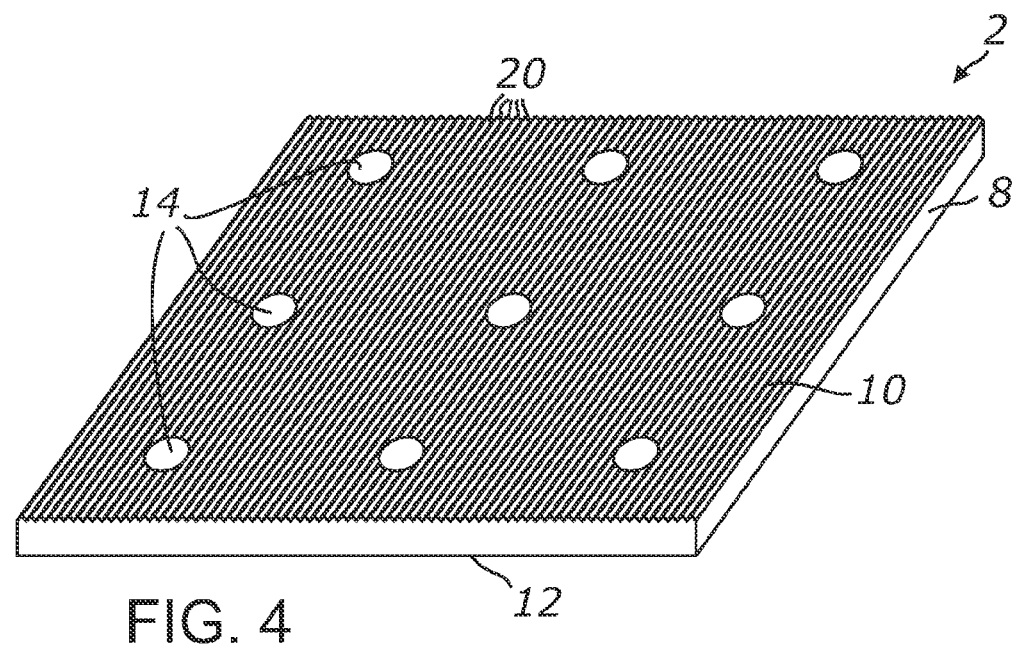
FIG. 4 is a schematic perspective view of an optical cover comprising prismatic surface corrugations and optical windows having round apertures, according to at least one embodiment of the present invention.

FIG. 3 illustrates an alternative configuration of optical cover 2 where optical windows 14 are formed by square-shape openings in corrugations 20. The spacing between individual windows 14 may be advantageously selected to be substantially greater than the width of the transversal aperture of each window 14. In FIG. 4, optical windows 14 are shown each having a round shape.

Figure 5:
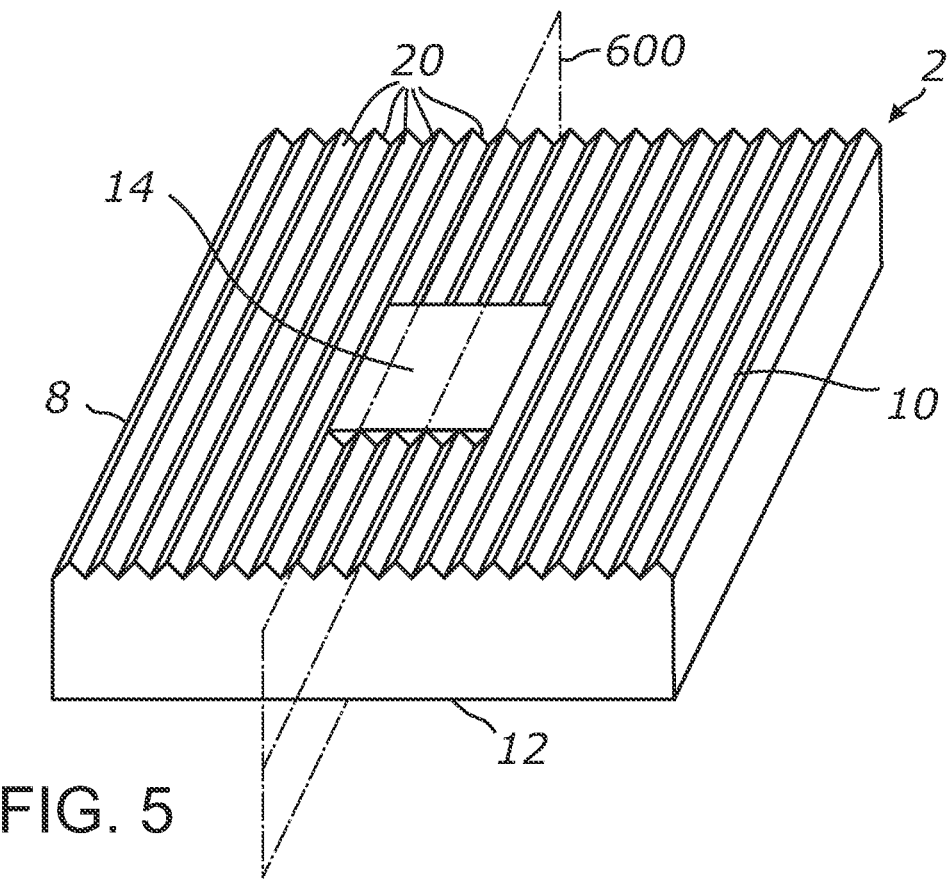
FIG. 5 is a schematic close-up view of an exemplary configuration of the square-aperture optical window, according to at least one embodiment of the present invention.

FIG. 5 shows a close up schematic view of a portion of optical cover 2 including a rectangular optical window 14. The smooth surface of optical window 14 represents an opening or interruption in corrugations 20 that may be used for inputting or outputting light to or from layer 8. Particularly, when cover 2 is used for enhancing the absorption in a light harvesting device, layer 8 may be placed on top of the light harvesting device so that corrugated surface 10 and windows 14 are facing the light source and the opposing surface 12 of layer 8 is facing the light harvesting device. The incident light may be input into optical cover through windows 14 by an array of micro-collectors, such as microlenses, and can be subsequently trapped underneath surface 10 by means of at least TIR from corrugations 20, thus allowing for light recycling and enhanced absorption.

Transparent layer 8 may be formed from a sheet or continuous webs of optically transparent material by means of extrusion or hot pressing by an embossing roller or cylinder which surface is formed with the a negative replica of the suitable prismatic pattern of surface 10.

Any other methods may be used that are directed at creating a sufficiently optically transparent structure with a prismatic surface pattern. Particularly, layer 8 can be made from a resin, melt or polymer using injection molding, compression molding, casting, replication, imprinting, UV or heat curing, micro-machining, laser ablation, grinding, chemical etching, beam etching and the like. The prismatic structures of corrugations 20 may be conventionally engraved onto rolls or plates and then transferred to the substrate by means of extrusion, casting and/or embossing. In a non-limiting example, the prismatic structures of corrugations 20 may be formed from a UV-curable polymer layer deposited on top of a thin sheet or film substrate.

Suitable materials for making layer 8 include but are not limited to optical glass, PMMA (acrylic), silicone, polycarbonate, optical quality PET (polyethylene terephthalate), polystyrene, polyolefin, polyesters, APET, PETG, or PVC, as well as any optically clear resin which is obtainable by polymerization and curing of various compositions.

Figure 6:
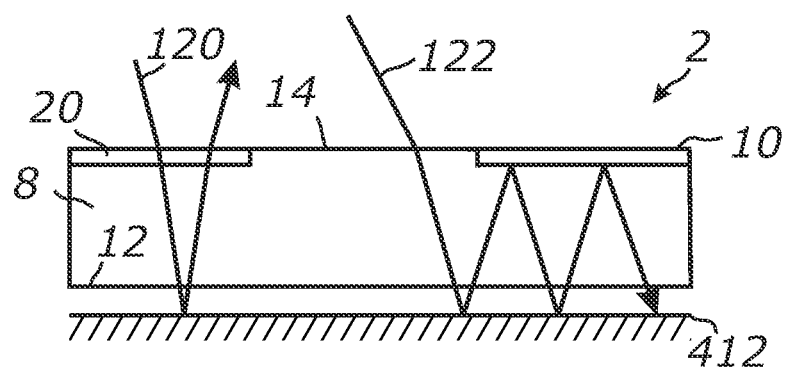
FIG. 6 illustrates, in a schematic cross-section, an optical cover portion and raytracing of exemplary light rays propagating through an optical window in a corrugated surface, according to at least one embodiment of the present invention.

The light input and trapping function of the embodiment employing smooth-surface optical windows 14 is further illustrated in FIG. 6 which schematically shows a cross-section of cover 2 shown in FIG. 5. The illustrated cross-section is taken along a plane 600 which is perpendicular to the prevailing plane of layer 8 and parallel to the longitudinal axis of corrugations 20. For the purpose of illustrating the exemplary operation of optical cover 2, FIG. 6 further shows a reflective surface 412 positioned underneath layer 8.

Referring to FIG. 6, let's first describe a path of a light ray 120 entering layer 8 through the corrugated portion of surface 10. It will be appreciated that, due to the geometry of incidence and due to the transparency of surface 10 and layer 8, ray 120 will pass through layer 8 and exit on the side of surface 12. Ray 120 will further reflect from reflective surface 412, enter layer 8 for the second time and exit from surface 10 back into the environment.

Now, describe the path of a ray 122 entering optical window 14 at an angle with respect to a surface normal. Ray 122 enters layer 8 undergoing refraction at the smooth surface of window 14 and exits from the opposing side defined by surface 12. Ray 122 is further reflected by surface 412 after which it enters layer 8 for the second time and strikes a corrugated portion of surface 10 from the inside of layer 8. Obviously, when the incidence angle of ray 122 onto surface 10 is less than $\theta_{max}$ in a plane perpendicular to corrugations 20, ray 122 will undergo TIR from the inclined faces of corrugations 20 and will be reflected back into layer 8 regardless of the incidence angle in plane 600 which is parallel to corrugations 20. As further illustrated in FIG. 6, ray 122 may continue propagating within the space defined by retroreflective corrugated surface 10 and reflective surface 412 by repetitive bouncing from the respective surfaces. Thus, due to the retroreflective properties of surface 10, light entering cover 2 through window 14 may be trapped underneath surface 10. Therefore, when any suitable photoabsorptive layer having a relatively weak single-pass absorption is provided between surfaces 12 and 412, the absorption and utilization of light may be substantially enhanced by increasing the optical path length and by providing a multiple passage of light though the layer. Light ray which energy is not sufficiently absorbed in a single path may thus be recycled for an improved absorption due to light trapping provided by the structure of optical cover 2.

It should be understood that providing optical windows 14 in corrugated surface 10 is essential for the proper input of light into layer 8. For example, stray ray 120 entering layer 8 through one of the corrugations 20 will be generally bent at an angle to surface normal which is greater than $\theta_{max}$ in a plane perpendicular to the longitudinal axis of corrugations 20 even when the ray incidence is normal in a plane parallel to corrugations 20, as a matter of optics. This stray ray will therefore not be trapped by surface 10 unless it is internally redirected at an angle favorable for retroreflection.

Since, in the example illustrated in FIG. 6, window 14 has a smooth surface extending parallel to the prevailing planes of layer 8 and surface 10 and surface 412 also extends parallel to said planes, light rays entering any window 14 at a normal incidence angle may exit from the window 14 after reflecting from layer 412. In order to enhance light trapping for normal-incidence rays, each window 14 may be configured to include one or more smooth or light-scattering surfaces inclined at an angle with respect to the plane of surface 10.

Possible variations of the surface relief of optical windows 14 are not limited to the smooth surface portions which are parallel to the prevailing plane of layer 8 and/or surface 10. The surface, or any its portion, of optical windows 14 may be sloped with respect to the plane of surface 10 in any plane other than that perpendicular to the longitudinal axis of corrugations 20. The surface of windows 14 may also be microstructured by forming multiple sloped facets provided that the surface profile in a cross-section perpendicular to the longitudinal axis of corrugations 20 remains parallel to the prevailing plane of layer 8. Useful examples of surface microstructures that satisfy the above condition may include surface corrugations which longitudinal axis extends generally perpendicular to the longitudinal axis of corrugations 20.

Figure 7:
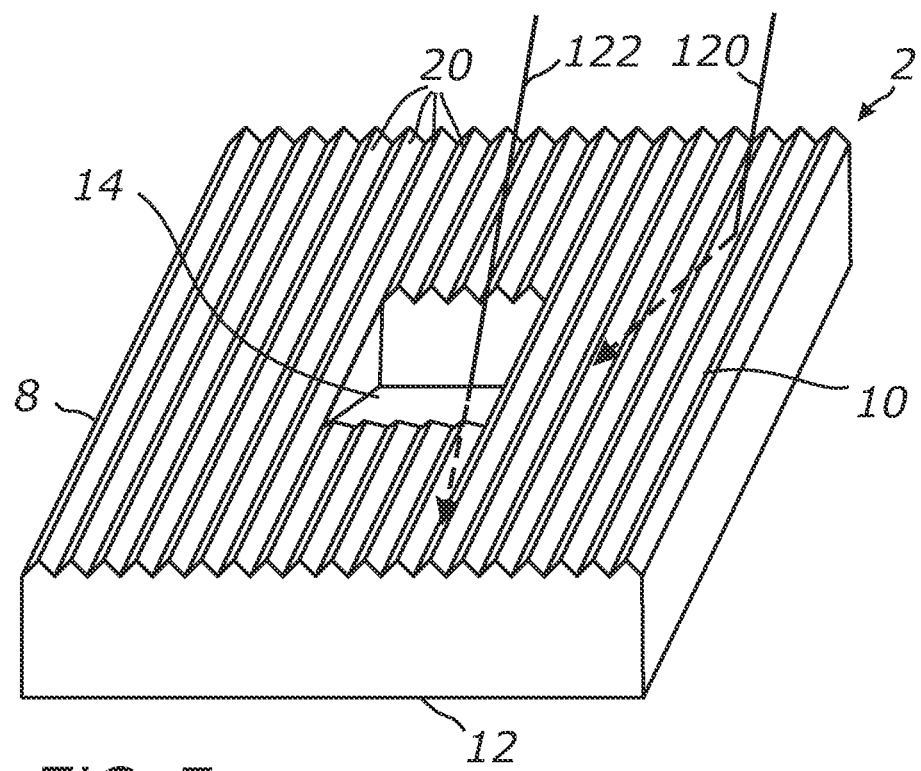
FIG. 7 is a schematic view of an optical cover portion including a square-aperture optical window comprising a prismatic cavity, according to at least one embodiment of the present invention.

FIG. 7 shows a portion of optical cover 2 where an individual optical window 14 is formed by a rectangular opening in corrugations 20. The opening further includes a V-shaped prismatic groove which longitudinal axis is perpendicular to the longitudinal axis of corrugations 20. The prismatic groove has inclined refractive facets which have a suitable slope angle in a plane which is perpendicular to the prevailing plane of layer 8 and parallel to the longitudinal axis of corrugations 20. It will be appreciated that, even though the surface of optical window of FIG. 7 has facets which are sloped with respect to the plane of surface 10 in a plane parallel to the longitudinal axis of corrugations 20, it will still have no slope in a plane transversal to the corrugations.

The refractive facets which are inclined in a plane parallel to corrugations 20 are capable of refracting the incident rays away from the cavity which can be useful, for example, for transporting light to a predetermined location on layer 8 or simply for reducing the chance of the ray exiting from the same optical window if it eventually gets reflected from any reflective surface which may be located underneath surface 12.

Figure 8:
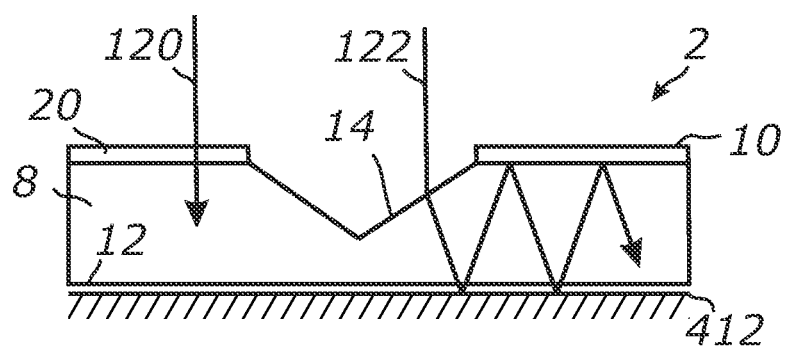
FIG. 8 is a schematic cross-sectional view of optical window shown in FIG. 7, according to at least one embodiment of the present invention.

FIG. 8 illustrates operation of the portion of cover 2 shown in FIG. 7. Similarly to FIG. 6, FIG. 8 shows a cross-section in a plane parallel to the longitudinal axis of corrugations 20 and perpendicular to the prevailing plane of layer 8. Accordingly, reflective surface 412 is shown positioned adjacent to surface 12 for illustrating purposes. Although, it should be understood that surface 412 may be positioned at any suitable distance from layer 8 or it may be provided on surface 12 without any gap. Surface 412 may be represented, for example, by a specularly reflective mirrored surface, scattering surface, retroreflective surface, or a TIR surface. Furthermore, it should be understood that optical cover 2 may operate with multiple reflective (semi-transparent) surfaces or without any reflective surfaces at all. The light trapping may also be effectuated using any internal reflective surfaces of the light harvesting device or any other suitable device that may be placed underneath cover 2.

Referring to FIG. 8, a near-normal (in the illustrated cross-section) ray 122 strikes an inclined refractive facet of optical window 14 and is further directed toward surface 12 at a greater angle with respect to a normal to both surfaces 10 and 12. The slope of the refractive facet results in light bending away from window 14 in the plane of the drawing. Therefore, when ray 122 is reflected from surface 412 and reaches surface 10, it strikes a corrugated portion of the latter. Since isosceles corrugations 20 act a prismatic TIR retroreflectors, ray 122 is losslessly reflected from surface 10 and can propagate along corrugations 20 while being trapped in cover 2 by means of at least TIR. Optical cover 2 and reflective surface 412 thus operate a waveguide allowing light to travel a considerable distance along the prevailing plane of cover 2.

For comparison, ray 120 entering layer 8 through one of the corrugations 20 does not incur any additional refraction in this cross-section. However, as explained above in reference to FIG. 5 and FIG. 6, ray 120 may have a significant refraction in the perpendicular cross-section depending on the incidence angle onto the faces of corrugations 20 which may result in ray 120 exiting from surface 10 without light trapping.

Figure 9:
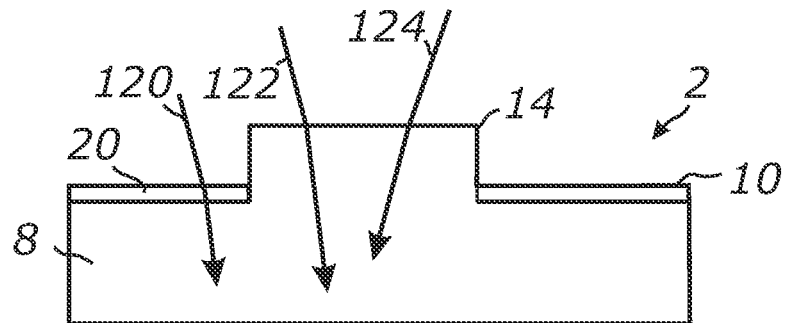
FIG. 9 is a schematic view illustrating a further example of an optical window comprising a rectangular (in a cross-section) extension above a light receiving surface, according to at least one embodiment of the present invention.
Figure 10:
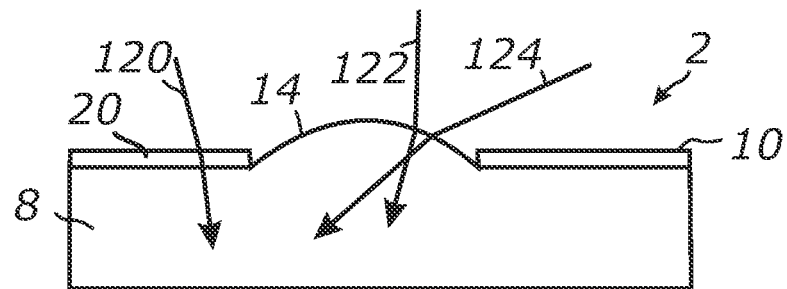
FIG. 10 is a schematic view illustrating a yet further example of an optical window comprising a convex surface, according to at least one embodiment of the present invention.

Further variations of the surface of optical windows 14 may be employed. For example, FIG. 9 shows a planar smooth surface of optical window 14 which is extended above the surface 10 and corrugations 20. In a different example illustrated in FIG. 10, optical window 14 is formed by an opening in corrugations 20 which has a lens-like convex surface. It will be appreciated that such a convex surface as well as any sloped surface profile may deflect the normal incidence rays at generally higher angles with respect to a normal to surface 10 compared to the case when optical window 14 has a smooth surface extending parallel to surface 10.

Figure 11:
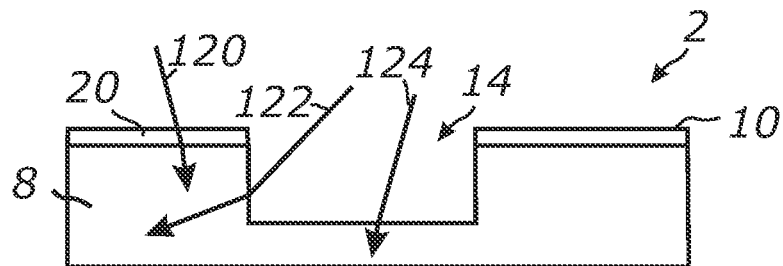
FIG. 11 is a schematic view illustrating a yet further example of an optical window comprising a cavity having a rectangular shape in a cross-section, according to at least one embodiment of the present invention.
Figure 12:
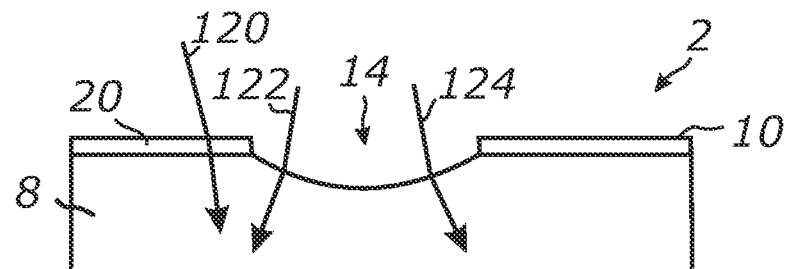
FIG. 12 is a schematic view illustrating a yet further example of an optical window comprising a concave surface, according to at least one embodiment of the present invention.
Figure 13:
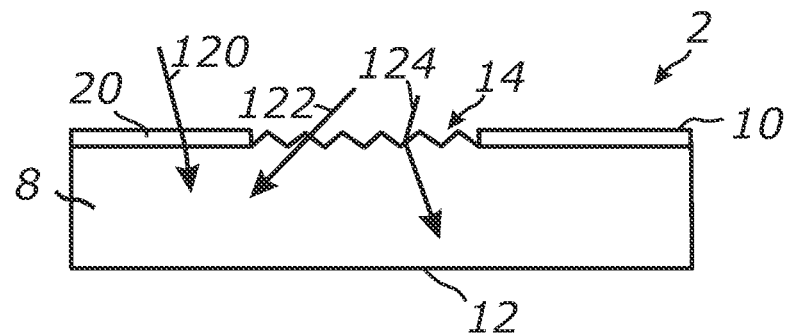
FIG. 13 is a schematic cross-sectional view illustrating a yet further example of an optical window comprising microstructured surface, according to at least one embodiment of the present invention.

In a yet further example of FIG. 11, optical window 14 is formed by a rectangular (in a cross-section) cavity having smooth bottom surface and side walls which may also participate in refracting the incident rays in a plane parallel to the longitudinal axis of corrugations 20. It will be appreciated that the cavity also represents an opening in corrugations 20 which locally suppresses the normal refraction and/or refraction properties of otherwise corrugated surface 10. In a yet further illustrative example of FIG. 12, optical window 14 is formed by a smooth concave cavity dispersing the incident rays in the plane parallel to the longitudinal axis of corrugations 20. In FIG. 13, a yet further example is shown where optical window 14 is formed by a microstructured surface or a plurality of surface relief features such as corrugations having longitudinal axis generally perpendicular to the longitudinal axis of corrugations 20. By referring to rays 122, 124, such microstructure can be employed to communicate a broader angular spread to the incident light within layer 8 compared to the indirect stray light exemplified by ray 120. It should be understood that this invention is not limited to the illustrated examples of optical windows 14 and may include any other types or configurations of surface relief features, such as, for example, prismatic grooves, blind holes, through holes, undercuts, notches, surface discontinuities, discontinuities in layer 8, various kinds of surface texture, and the like.

Figure 14:
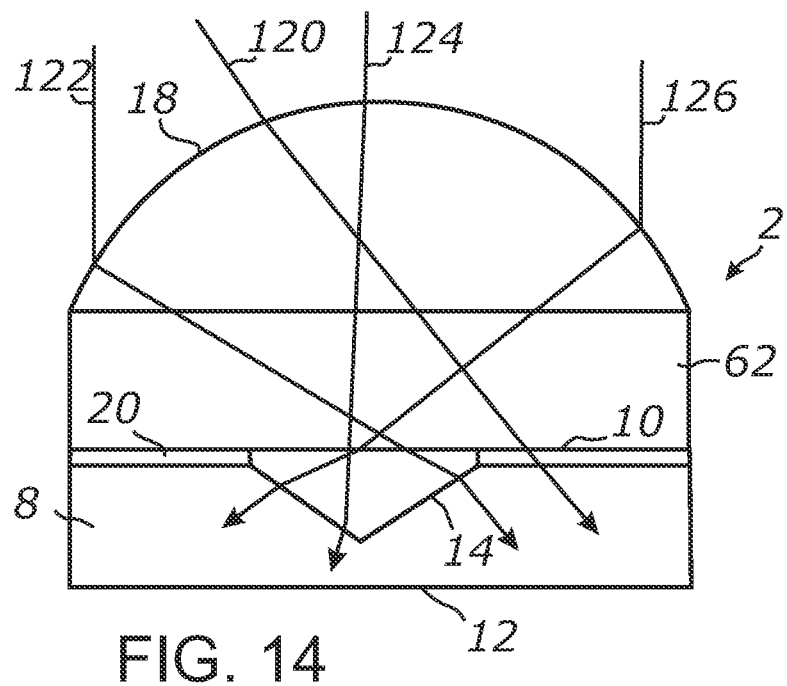
FIG. 14 is a schematic cross-sectional view and raytracing of an optical cover portion further showing a lens element, according to at least one embodiment of the present invention.

Optical cover employing isosceles surface corrugations 20 may further employ one or more lenses or other means for collecting light from a larger area and focusing it onto a smaller aperture of the respective optical window 14. FIG. 14 shows a portion of optical cover 2 comprising a combined optical element in which an imaging lens 18 is disposed on top of layer 8 having optical window 14 shaped as a prismatic groove in surface 10. The prismatic groove is formed perpendicular to the longitudinal axis of corrugations 20. It is preferred that the optical axis of each lens 18 is aligned with respect to the center of the aperture of the respective optical window 14. Furthermore, the optical and dimensional parameters of lens 18 are selected so that light deflecting element 14 is disposed at or near the focal area or focus of the lens.

Hereinafter, we generally associate each pair of lens 18 and optical window 14 with the term "opticule". In the context of the present invention and referring to arrays of optical microcomponents, we define the term "opticule" as an elementary combination of a larger-aperture primary focusing optical component and an associated smaller-aperture secondary optical component disposed in the primary's focus and designed to further redirect or redistribute light collected by the primary component. However, this term should be understood loosely and should not be interpreted as limiting the scope of the present invention in any way.

An optical spacing layer 62 may be provided between lens 18 and surface 10 to accommodate the focal length of lens 18. Layer 62 may be molded from the same material as lens 18 and be an integral part of lens 18. When layer 62 is formed from a different material, it should preferably be index-matched to the material of lens 18.

In operation, incident rays 122, 124 and 126 of FIG. 14 are collected by lens 18 and focused onto optical window 14 where said rays are further refracted by the facets of the prismatic groove and injected into layer 8 so that the injected light can further propagate in layer 8 toward the opposing surface 12 with at least some divergence in the plane parallel to corrugations 20. De degree of angular divergence in this cross-section may vary in a broad range and may take values from 0° to 90°. However, as noted above, it is preferred that the ray dispersion in the plane perpendicular to the longitudinal axis of corrugations 20 is less than $\theta_{max}$ at least for rays propagating in layer 8 at near normal angles with respect to surface 10 in a plane perpendicular to the common longitudinal axis of corrugations 20, in order to enable the most efficient mode of light trapping. Ray 120 entering layer 8 elsewhere through surface 10 may generally obtain a propagation angle greater than $\theta_{max}$ in the perpendicular plane which is not ideal for light trapping. However, ray 120 may still freely pass through optical cover 2 and therefore can be absorbed by a suitable light harvesting device which may be disposed underneath surface 12.

Optical windows 14 may be formed in surface 10 by a variety of means and techniques. Suitable techniques may employ any optical alterations of corrugated surface 10 allowing a convergent beam of light to pass freely through surface 10 so that the angular spread of the beam injected into layer 8 will generally not exceed the retroreflection angles characterizing corrugations 20. Optical windows 14 may also be formed as separate pieces and then applied externally to surface 10, provided that resulting optical coupling alters the optical properties of surface 10 and locally suppresses light refraction by corrugations 20 upon light entrance into layer 8.

Figure 15:
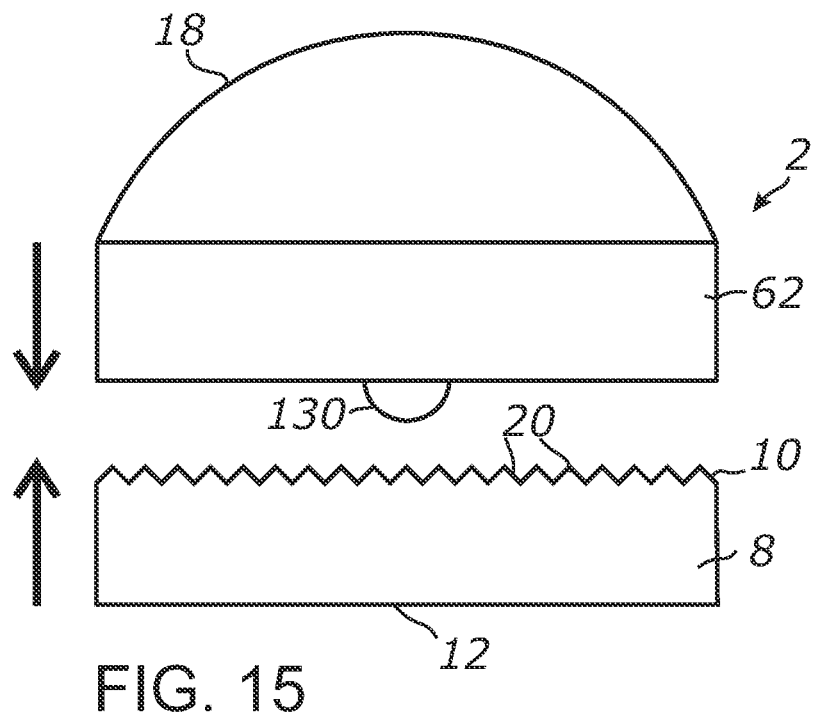
FIG. 15 is a schematic cross-sectional view illustrating an exemplary method of making a optical window, according to at least one embodiment of the present invention.
Figure 16:
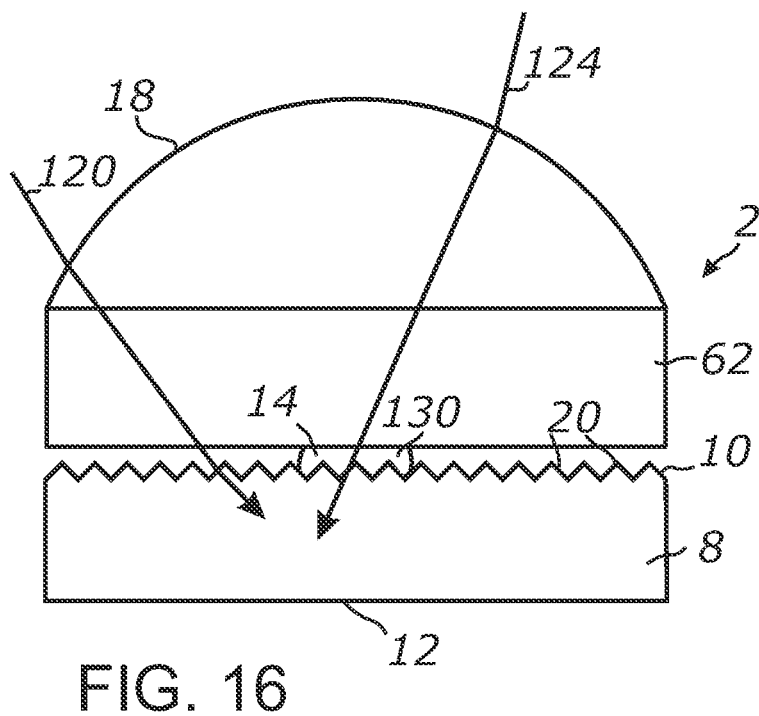
FIG. 16 is a schematic cross-sectional view showing a optical window formed by optical coupling a lens element to an optical cover, according to at least one embodiment of the present invention.

In FIG. 15 and FIG. 16, a non limiting example of fabricating optical window 14 is illustrated. In FIG. 15, a droplet 130 of high-viscosity optical adhesive or encapsulant is disposed on the back side of lens 18 and centered with respect to the optical axis of the lens. By way of example and not limitation, droplet 130 may be formed by precision dispensing of a UV- or temperature-curable adhesive, silicone, melted or dissolved optically clear polymer, epoxy compound or the like. Droplet 130 may have a round shape in a longitudinal section or an elongated cylindrical shape, depending on the configuration of the lens 18 (point focus or linear focus). Lens 18 and layer 8 are then pressed against each other as indicated by the arrows on the left so that droplet 130 is forced to fill the corrugations 20 and create a direct optical contact between lens 18 and layer 8 thus forming optical window 14 for surface 10. Optical window 14 will thus be formed by the droplet 130 disposed in optical contact with surface 10, as illustrated in FIG. 16. Droplet 130 acts as an optical coupling element and suppresses the effect of corrugations 20 on the light bending characteristics of surface 10. The refractive index of the material of droplet 130 should preferably be selected to approximately match those of lens 18 and layer 8 in order to eliminate parasitic Fresnel reflections and other related losses. The matched refractive index may thus also substantially suppress any refraction upon light entering layer 8 through the respective window 14. Droplet 130 may also be allowed to cure thus also creating a physical adhesion.

Referring further to FIG. 16, ray 124 focused by lens 18 on optical window 14 enters layer 8 without additional bending due to the matched refractive index of the optical material of droplet 130 and may be trapped underneath surface 10 when the ray propagates at angles that allow for retroreflection from corrugations 20. Ray 120 which arrives from a large off-axis angle is not properly focused on optical window 14. Ray 120 therefore undergoes refraction on the back surface of lens 18 and on a facet of corrugations 20 which can generally result in a more slant propagation angle in layer 8 in a direction perpendicular to the axis of corrugations 20 and result in weaker light trapping.

The following drawings illustrate the operation and light trapping principles of the present invention in more detail. First, for comparison, the input into layer 8 through corrugations 20 with no light trapping will be described.

Figure 17:
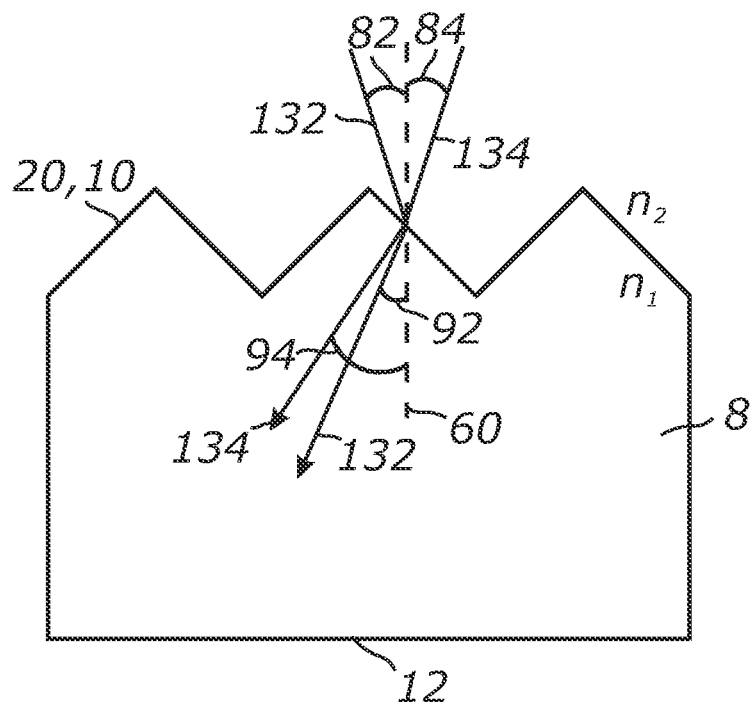
FIG. 17 is a schematic cross-sectional view illustrating light input into an optical cover through a corrugated surface, according to at least one embodiment of the present invention.

FIG. 17 illustrates light input into layer 8 through corrugations 20 in a plane perpendicular to the longitudinal axis of said corrugations. A ray 132 strikes one of the facets of corrugations 20 at an angle 82 with respect to a normal 60 to the prevailing plane of layer 8. Obviously, when surfaces 10 and 12 of layer 8 are parallel to each other, normal 60 is also a normal to the prevailing plane of both surfaces 10 and 12. Ray 132 is refracted by the facet into layer 8 where it forms an angle 92 with respect to normal 60. This angle is defined by the slope angle of the facet and the refractive indices of the material of layer 8. Accordingly, a ray 134 impinging onto the same face of corrugation 20 and making an angle 84 with respect to normal 60 is refracted at an angle 94 with respect to the same normal.

It will be appreciated that the 45° slope of the refractive face of corrugation 20 results in bending both rays 132 and 134 so that the respective angles 92 and 92 are always greater than the maximum angle of deviation from normal 60 that allows for retroreflection from any of the corrugations in surface 20. As a result, if either ray is reflected from surface 12 or any parallel reflective surface underneath layer 8 at the same reflection angle as the angle of incidence, it will exit from surface 10 upon its next encounter of corrugations 20, so no light trapping by surface 10 may occur.

Figure 18:
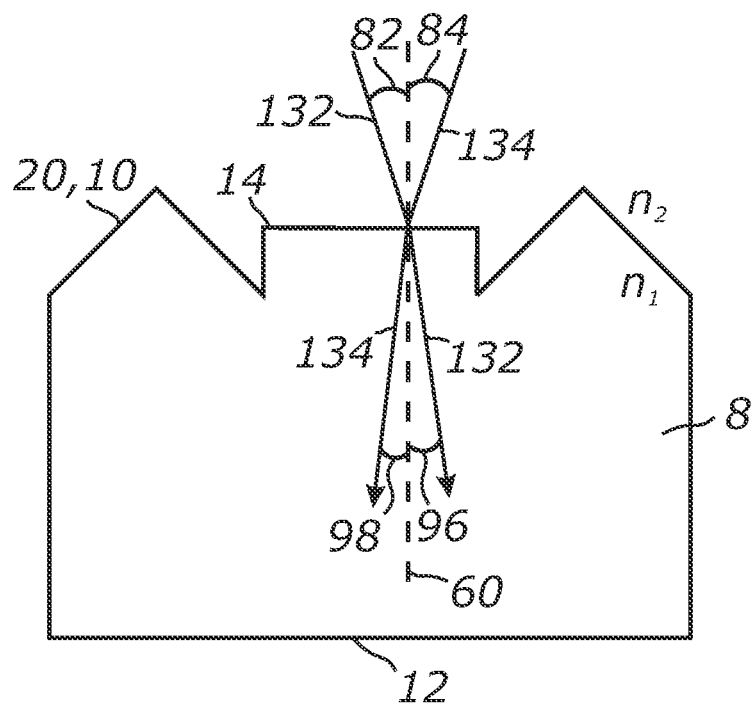
FIG. 18 is a schematic cross-sectional view illustrating light input into an optical cover through an optical window, according to at least one embodiment of the present invention.

In FIG. 18, the light entrance into layer 8 through optical window 14 is illustrated. Rays 132 and 134 strike the smooth horizontal surface of optical window 14 and are refracted into the body of layer 8 making respective angles 96 and 98 with normal 60. It will be appreciated that, at this geometry of light input into layer 8, both rays 132 and 134 are still refracted by the surface of optical window 14, but angles 96 and 98 will generally be lower than angles 92 and 94 of FIG. 17. According to a preferred embodiment of the present invention, optical window 14 may be designed to accept light in a predefined angular range in the illustrated plane, which is perpendicular to the longitudinal axis of corrugations 20) and direct said light into layer 8 at angles generally allowing for retroreflection from corrugations 20 by means of TIR.

For example, consider light beam incident onto optical window 14 at a near-normal incidence in a plane parallel to the longitudinal axis of corrugations 20 by having some divergence in a perpendicular plane. It can be shown that optical window 14 having a smooth surface with a straight-line profile extending parallel to surface 10 in a cross-section perpendicular to the longitudinal axis of corrugations 20 can accept light at the incidence angles of up to approximately ±4° if the layer 8 material is acrylic and up to approximately ±9° if the material is polycarbonate. Any light rays within the above acceptance angles, for the respective materials of layer 8, will be trapped by surface 10 due to TIR retroreflection from corrugations 20. It will be appreciated that, if the incidence angle in the plane parallel to the longitudinal axis of corrugations 20 is other than the normal, the acceptance angle will be even greater thus resulting in an improved light trapping.

Figure 19:
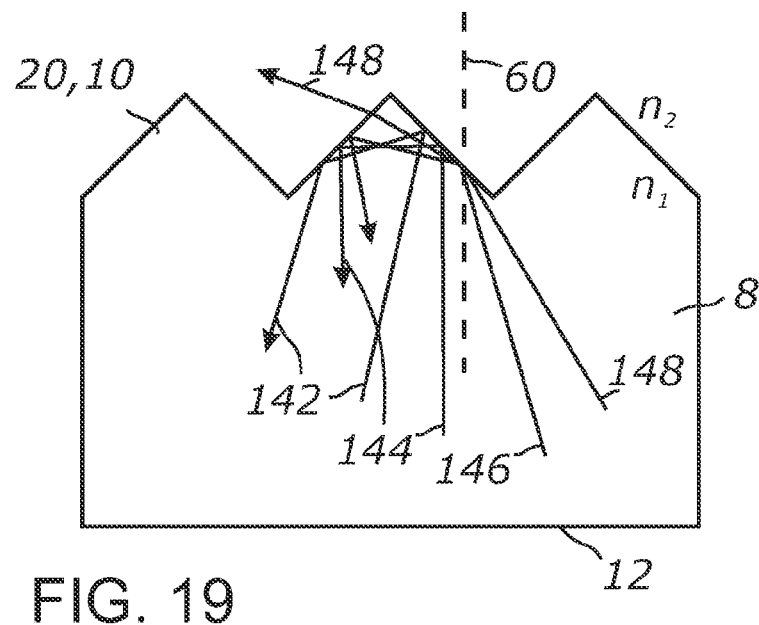
FIG. 19 is a schematic cross-sectional view illustrating light trapping in an optical cover by using surface corrugations, according to at least one embodiment of the present invention.

FIG. 19 further illustrates light trapping or light rays striking a facet of corrugation 20. These rays may exemplify rays entered into layer 8 through one of the optical windows 14 and then reflected from a reflective surface below (not shown). Alternatively, the rays shown in FIG. 19 may exemplify light emitted by a light source disposed anywhere underneath surface 10, also including the space between surface 10 and 12.

Accordingly, rays 142, 144 and 146 propagating in layer 8 at angles smaller than the angle allowing for TIR retroreflection from corrugations 20 may undergo double TIR from the adjacent faces of an individual corrugation 20 and may thus be reflected back into layer 8 at the same angle in the a plane perpendicular to the corrugations' longitudinal axis. In other words, each isosceles right-angle corrugation 20 acts as a TIR retro-reflector for these rays trapping said rays them within optical cover 2. Accordingly, ray 148 propagating in layer 8 at an angle greater than a predetermined acceptance angle in the same plane, may exit optical cover 2 after one or two interactions with the facets of corrugations 20. By way of example and not limitation, ray 148 may represent stray, off-axis light.

Figure 20:
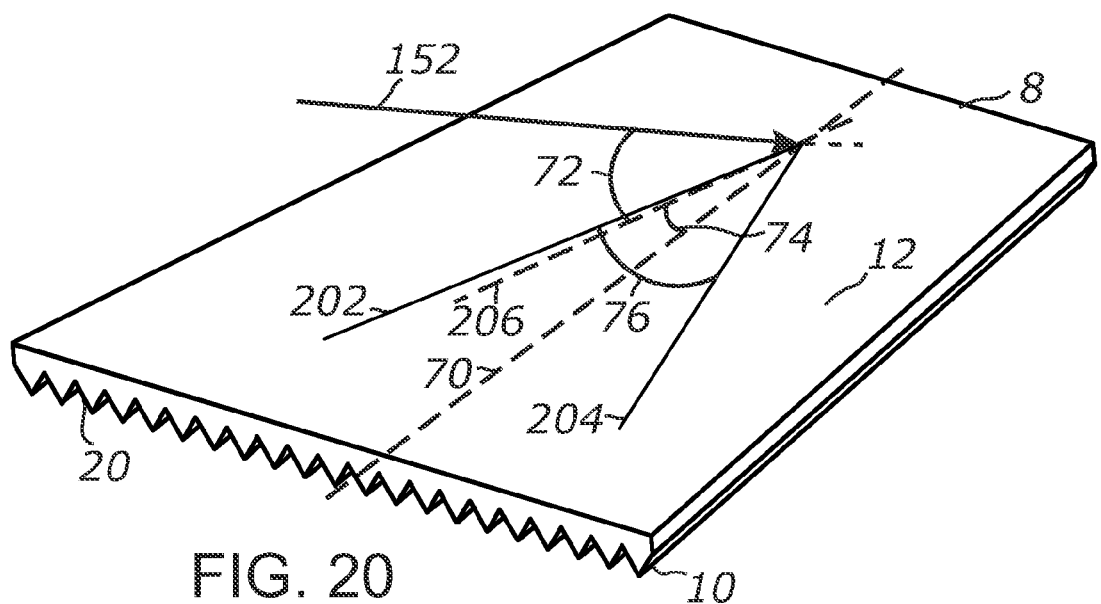
FIG. 20 is a further illustration of light trapping in an optical cover, according to at least one embodiment of the present invention.

In studying the light trapping and light guiding properties of optical cover 2, the path of a ray entering layer 8 through surface 12 can be considered. In FIG. 20 showing a portion of layer 8 having corrugated surface 10 and the opposing smooth surface 12, a ray 152 enters layer 8 through surface 12 and makes an angle 72 with surface 12 in a plane perpendicular to the plane of optical cover 2. As it can be seen, angle 72 is also an angle between ray 152 and a ray projection 206 onto surface 12. In conjunction with ray 152 and surface 12, an angle 74 can be defined as the angle between projection 206 of ray 152 and a longitudinal axis 70 of corrugations 20 in the plane of surface 12. Accordingly, an angle 76 may be defined as the angle of the cone which limits the angular deviation of incident rays from axis 70 for which the requirement of light trapping by optical cover 2 can still be satisfied. According to one aspect, angle 76 may be defined by the uttermost ray paths 202 and 204 in the plane of surface 12. When no light trapping occurs, the incident light received by surface 12 will be transmitted by layer 8. When surface 10 of layer 8 is contacting with air or vacuum and the refractive index of layer 8 is $n_1$, angle 76 can be found from the following expression:

$$2\cos^{-1}\sqrt{\frac{4 - n_1^2(2 - \sqrt{2})}{2 + \sqrt{2}}},$$

which gives the angular value of about 55° in case of layer 8 made from acrylic ($n_1$=1.49).

Figure 21:
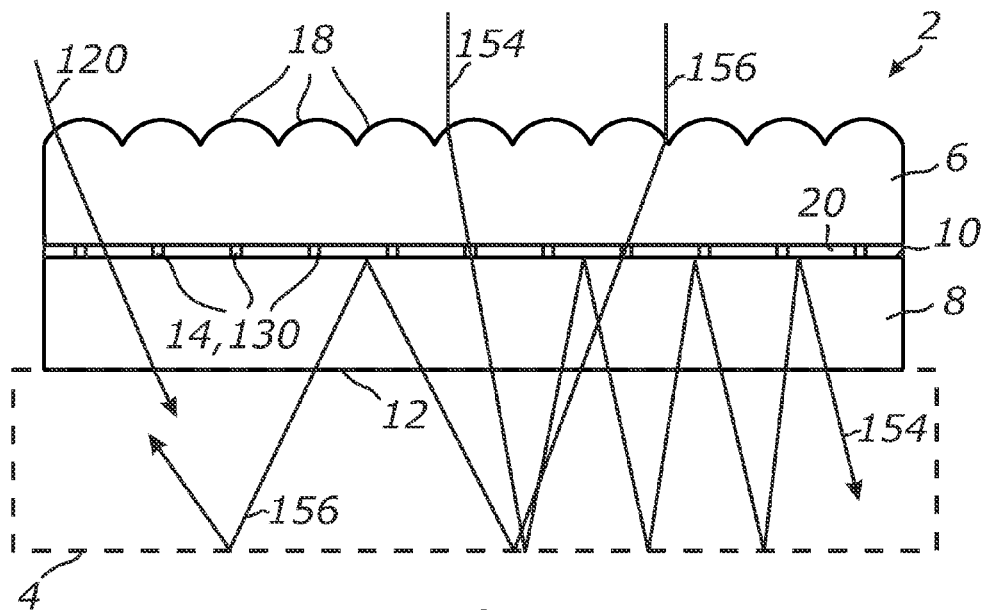
FIG. 21 is a schematic cross-sectional view of an optical cover employing a light harvesting device, according to at least one embodiment of the present invention.

FIG. 21 shows, in a longitudinal section, an embodiment of optical cover 2 when it is used to enhance useful light absorption in a light harvesting device 4. Representative examples of light harvesting devices that may benefit from the light trapping capability of cover 2 include but are not limited to photovoltaic cells or panels, heat collectors, radiation sensors, liquid-carrying photoreactors and the like. For the purpose of illustrating the present invention, it is preferred that light harvesting device 4 is weakly absorbing the incident light and has a relatively thin photoabsorptive layer which requires a substantially longer optical path compared to its thickness in order to fully absorb the light.

Referring to FIG. 21, optical cover 2 comprises lens array 6 and transparent layer 8 having corrugated surface 10 and opposing smooth surface 12. Layer 8 is disposed in a good optical contact with light harvesting device 4 along the extent of surface 12. Corrugations 20 of surface 10 are shaped in the form of elongated right-angle isosceles prisms disposed adjacent to each other. Each corrugation 20 has two symmetrically disposed faces facing each other and being inclined at an angle of about 45° with respect to a normal and to the prevailing plane of surface 10. The material of transparent layer 8 is appropriately selected so that corrugations 20 may act as retroreflectors for at least some rays internally incident onto surface 10 at incidence angles being lower than a predetermined acceptance angle in a plane perpendicular to the longitudinal axis of the corrugations.

The optical properties of surface 10 are selectively altered by a plurality of optical windows 14 formed by an array of cured droplets 130 of an optical polymer disposed in optical contact with light harvesting device 4. Droplets 130 are also providing optical and adhesive contact between layer 8 and lens array 6.

Lens array 6 comprises an array of imaging lenses 18 each configured to form a focus in the immediate proximity of the respective optical windows 14. Lenses 18 and optical windows 14 are vertically and horizontally aligned with respect to each other so that each pair of lens 18 and window 14 forms an individual opticule configured for coupling light into layer 8 of cover 2. Light harvesting device 4 is shown to have a reflective surface on its back that is facing away from layer 8. This reflective surface should preferably have high specular reflectivity and provide for an efficient reflection with minimum losses.

In operation, rays 154 and 156 are directed by lenses 18 to the respective optical windows 14 and are trapped by isosceles corrugations 20 of surface 10 so that the optical path of said rays through light harvesting device 4 is increased due to the increase of the incidence angle and due to multiple passage through the photoabsorptive layer of device 4. Off-axis ray 120 is transmitted by optical cover 2 towards light harvesting device 4 without passing through any of optical windows 14 and thus generally without light trapping.

It will be appreciated that the longitudinal cross-section depicted in FIG. 21 may represent a linear configuration of optical cover 2 in which optical windows 14 may be shaped as narrow parallel bands such as, for example, those depicted in FIG. 1 or FIG. 2, and in which lens array 6 may be formed by a linear lens array comprising cylindrical lenses. It will be appreciated that the same cross-section may also represent a plurality of discrete two-dimensional window areas which are spread across corrugated surface 10 (see, e.g., FIG. 3 and FIG. 4) and a plurality of matching point-focus lenses 18 in a two-dimensional lens array.

Figure 22:
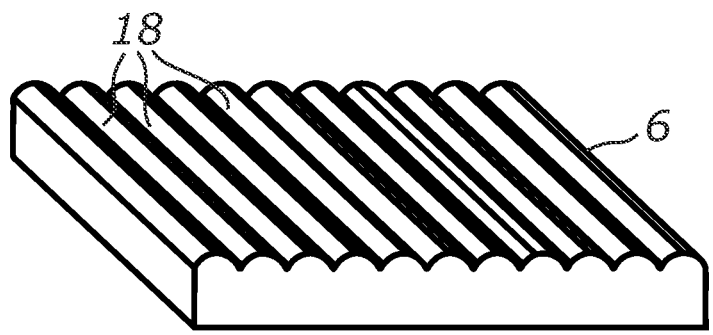
FIG. 22 is a schematic perspective view of a rectangular lens array employing cylindrical (linear-focus) lenses, according to at least one embodiment of the present invention.

Linear lens array 6 formed by cylindrical lenses 18 arranged on a single rectangular planar substrate is exemplified in FIG. 22. Lens array 6 is preferably positioned so that its side covered with lenses 18 is facing the intended source of light and the opposite side or surface is disposed adjacent to surface 10 of layer 8. The linear configuration of lens array 6 advantageously corresponds to the configuration of optical windows 14 which are arranged in parallel bands extending parallel to each other.

Figure 23:
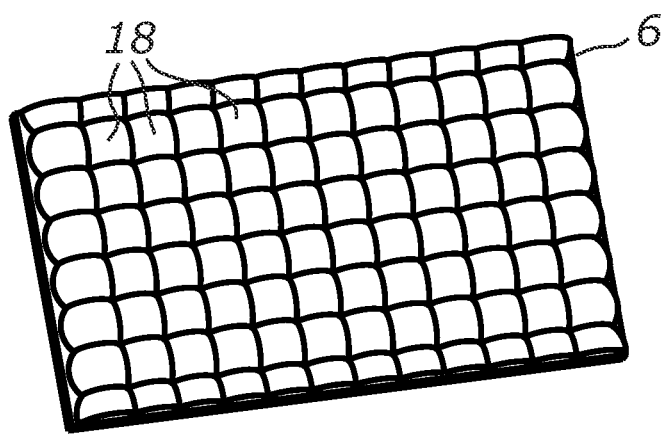
FIG. 23 is a schematic perspective view of a rectangular lens array employing square-shaped point-focus lenses, in accordance with at least one embodiment of the present invention, according to at least one embodiment of the present invention.
Figure 24:
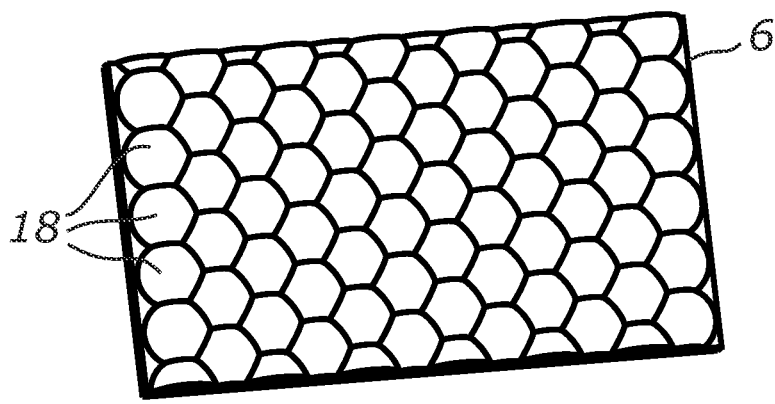
FIG. 24 is a schematic perspective view of a rectangular lens array employing hexagon-shaped point-focus lenses, according to at least one embodiment of the present invention.

In a further aspect of the present invention, FIG. 23 illustrates a densely packed configuration of lens array 6 comprising point focus lenses 18 arranged in row and columns. The point-focus lens arrays may particularly be suitable for injecting light into layer 8 which has discrete windows 14 arranged in a two-dimensional array, such as, for example, those illustrated in FIG. 3 and FIG. 4. Each point focus lens 18 has a square aperture which allows for covering about 100% of the lens array surface. FIG. 24 shows lenses 18 which apertures have an alternative hexagonal shape. Accordingly, when lens array 6 with hexagonal lenses 18 is used, optical windows 14 may also be arranged on surface 10 according to the same pattern as the lenses in the array.

The form factor of planar lens array 6 may be selected to match that of layer 8. A sandwich of lens array 6 and layer 8 can thus form a transparent layered sheet structure where lens array 6 represents a front sheet and layer 8 represents a back sheet or film. The number and disposition of individual lenses 18 in lens array 6 are selected to match those of optical windows 14 in layer 8 so that there is a one-to-one relationship between lenses 18 and optical windows 14. More particularly, each optical window 14 is preferably aligned with respect to the optical axis of the respective lens 18. Furthermore, the optical and dimensional parameters of lenses 18 are selected so that each optical window 14 is disposed at or near the focal area or focus of the respective lens 18.

In accordance with this invention, it is preferred that an effective focal length of each lens 18 is substantially shorter than the longitudinal or frontal dimensions of optical cover 2 in order to achieve better compactness. As a practical consideration, the effective focal length of lenses 18 is also selected to be approximately equal or slightly longer than the thickness of lens array 6 so that each lens 18 is designed to have a focus located outside of the lens array itself, preferably at a small pre-determined distance from the lens array.

For the purpose of this invention, the term "effective focal length" should be understood broadly and it also includes the cases when the effective focal length of can change depending on the optical properties of the material filling up the space between lens 18 and the focal area. In other words, the location of the focal area may be different, thus resulting in a different effective focal length, when a different material separates lens 18 and its focal area. By way of example, for the same geometrical parameters of a lens forming an individual lens 18, its effective focal length can be greater in high refractive index material (e.g., glass, silicon or PMMA) than in the air due to the difference in refractive indexes.

Accordingly, when positioned with one side representing the entrance aperture perpendicular to the incident beam, lens array 6 provides a plurality of foci on the opposite side, the foci being spaced apart from each other in accordance with the spacing of individual lenses in the lens array. With the lens array being planar and individual lenses having an identical optical configuration, the plurality of foci of individual lenses 18 provides a common focal plane disposed at a small predetermined distance from lens array 6. The entrance aperture of each optical window 14 may be selected to be substantially smaller than that of the respective lens 18 and have the size approximately equal or slightly larger than the focal area of the lens.

In different variations of the present invention, lens array 6 may comprise any desired optical structures distributed over its frontal surface and adapted for collecting, concentrating or collimating the impinging light. Any known light focusing structure which collects the energy from a larger area and focuses it to a smaller focal area can be used to form the individual focusing features of lens array 6. By way of example and not limitation, lenses 18 can be spherical or aspherical, imaging or non-imaging. Suitable light collecting or collimating structures that may be used in conjunction with optical windows 14 of the present invention may also include Fresnel lenses, TIR lenses, gradient index lenses, diffraction lenses, lens arrays, mirrors, Fresnel mirrors, mirror arrays and the like.

A convenient way of forming lens array 6 is by providing a transparent layer having a large array of spherical imaging lenses 18 on one of its surfaces. Lenses 18 may be fabricated using any conventional method such as replication, embossing, molding, micro-machining, grinding, chemical etching, beam etching and the like. The individual lenses 18 can be integrated with lens array 6 and preferably comprise the same material as the body of the array. Alternatively, lenses 18 can be disposed on a transparent substrate plate and fabricated of the same or a different material than the substrate plate. Individual lenses 18 may also be configured as separate pieces and attached to the substrate plate. Suitable materials include but are not limited to optical glass, polymethyl methacrylate (PMMA), silicone, polycarbonate, polystyrene, polyolefin, and any optically clear resin which is obtainable by polymerization and curing of various compositions and other methods directed at creating a sufficiently optically transparent structure. The placement of lenses 18 in lens array 6 can be according to any suitable spatial metric and by any desired means. For example, lenses 18 can be spaced apart, contacting each other or overlapping and can be positioned in any desired pattern in the array.

Figure 25:
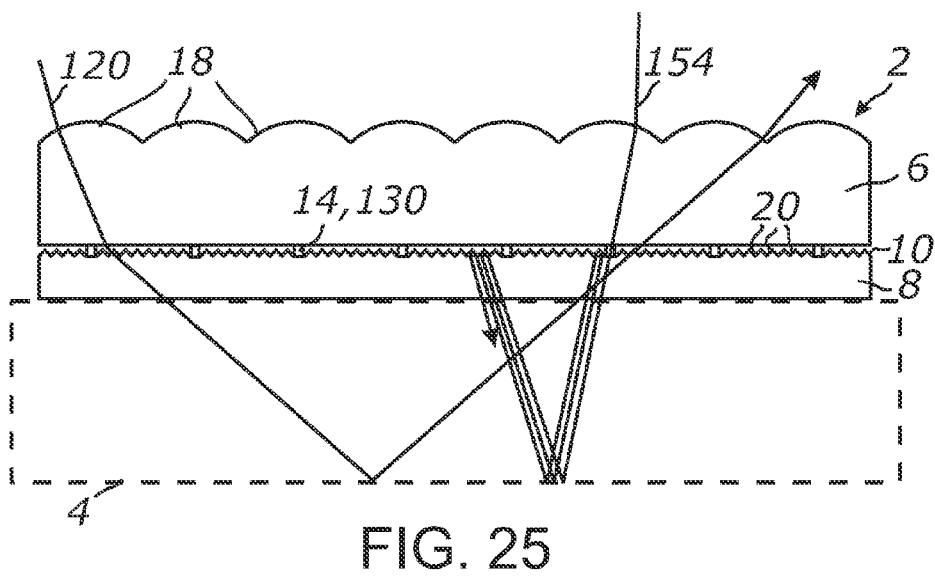
FIG. 25 is a schematic view, in a cross-section perpendicular to the cross-section shown in FIG. 21, of an optical cover employing a light harvesting device, according to at least one embodiment of the present invention.

In FIG. 25, the device of FIG. 21 is schematically shown in a cross-section perpendicular to the longitudinal axis of corrugations 20 for the case of two-dimensional (point-focus) configuration of optical windows 14 and lenses 18. Ray 154 is shown to undergo multiple reflections from the corrugated surface 10 and from a back surface of light harvesting device 4 until it is completely absorbed.

Accordingly, stray ray 120 enters lens array 6, then passes through transparent layer 8 and enters light harvesting device 4 at a skew incidence angle. Ray 120 further reflects from a back surface of device 4, passes through the device 4 once again and then exits through optical cover 2 after being at least partially absorbed. Thus, it will be appreciated that optical cover 2 may collect even stray or far off-axis rays and direct them onto the light harvesting device below, although the full benefits of light trapping may be better realized for on-axis rays that can be injected into layer 8 through windows 14 by means of focusing.

Figure 26:
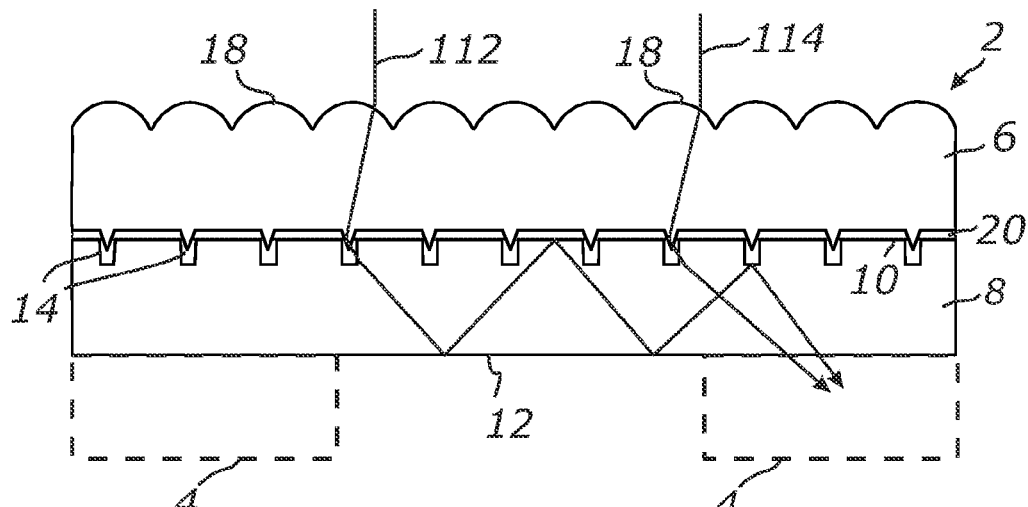
FIG. 26 is a schematic cross-sectional view of an optical cover used in conjunction with a light harvesting device comprising multiple light absorbing elements, according to at least one embodiment of the present invention.

FIG. 26 shows an embodiment of optical cover 2 further comprising multiple light harvesting devices spaced from each other along surface 12. Optical cover 2 also employs opticules with a two-stage refraction by means of prismatic extensions in the lens array 6 and optical windows 14 formed by high aspect ratio cavities in surface 10. The two-stage bending of the incident rays at the interface between lens array 6 and layer 8 allows for higher refraction angles so that the rays can propagate within layer 8 by means of TIR from both surfaces 10 and 12 along the longitudinal axis of corrugations 20 until they encounter at least one of the light harvesting devices 4 attached to surface 12. The optical contact between surface 12 and light harvesting device permits for an unimpeded light passage through surface 12 in the location where such contact is available. Accordingly, rays 112 and 114 trapped by cover 2 and transported along layer 8 with some light concentration can pass through the body of light harvesting device 4 one or more times and at a skew angle which enhances the useful light absorption.

When optical cover 2 is used as a waveguide, the reflectivity of surface 12 at low incidence angles may be enhanced by providing a highly reflective coating or by providing corrugations 20 which may also have the shape of isosceles right-angle prisms of the corrugations of surface 10.

Figure 27:
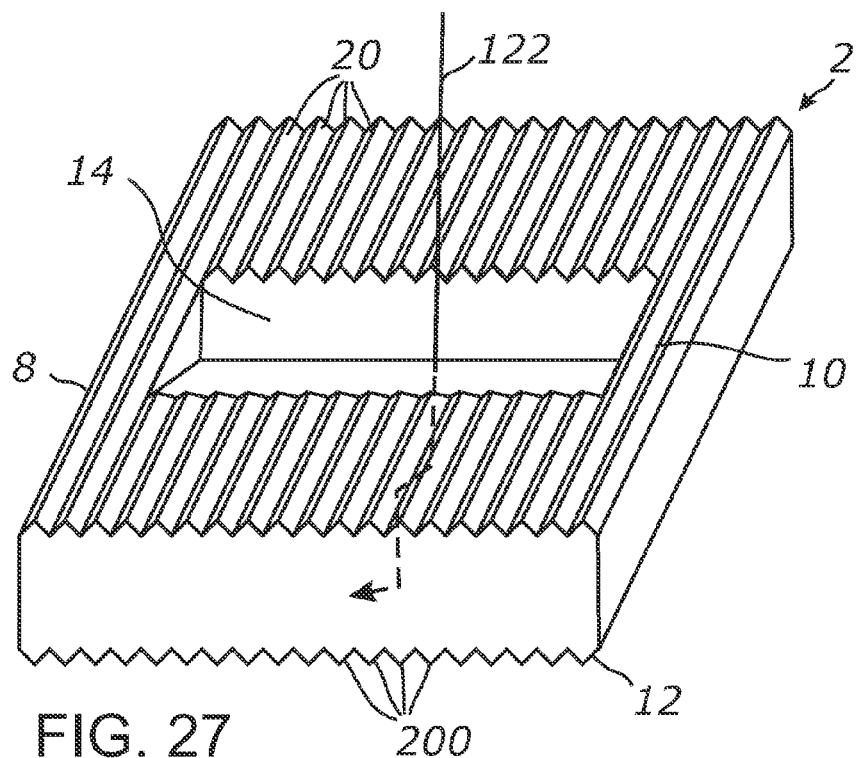
FIG. 27 is a schematic cross-sectional view of an optical cover portion employing opposing sloped surfaces, according to at least one embodiment of the present invention.

FIG. 27 illustrates an embodiment of optical cover 2 configured and operated as a light trapping waveguide. Cover 2 of this embodiment includes optically transparent layer 8 having two opposing broad surfaces 10 and 12. Surface 10 and 12 are extending generally parallel to each other and each employing pluralities of longitudinal isosceles surface corrugations 20 and 200, respectively. Both pluralities of corrugations 20 and 200 are extending parallel to a common reference line which is further referred to as a longitudinal axis of the corrugations. Layer 8 further comprises optical window 14 formed by elongated V-groove which longitudinal axis extends perpendicular to the longitudinal axis of corrugations 20 and 200.

In operation, ray 122 entering layer 8 through optical window 14 is deflected by a refractive facet of the V-shaped groove at an angle in a plane which is parallel to the longitudinal axis of corrugations 20 and perpendicular to the prevailing plane of layer 8. Ray 122 reflects from surface 12 by means of TIR retroreflection from corrugations 200 of that surface and strikes surface 10 from the inside of layer 8. The deflection angle provided by the refractive facets of window 14 should be sufficiently high to steer ray 122 away from window 14. Consequently, ray 122 will undergo TIR retroreflection from corrugations 20 of surface 10. It will be appreciated that, since TIR is practically lossless, the above retroreflection process may continue and ray 122 may propagate considerable distances in layer 8. Particularly, ray 122 may be guided towards a terminal edge of layer 8 where it can be emitted from the edge or absorbed by a light harvesting device that can be attached to the edge. Alternatively, a light harvesting device may be embedded into layer 8 and gradually absorb the energy of ray 122 as it propagates through the layer.

Figure 28:
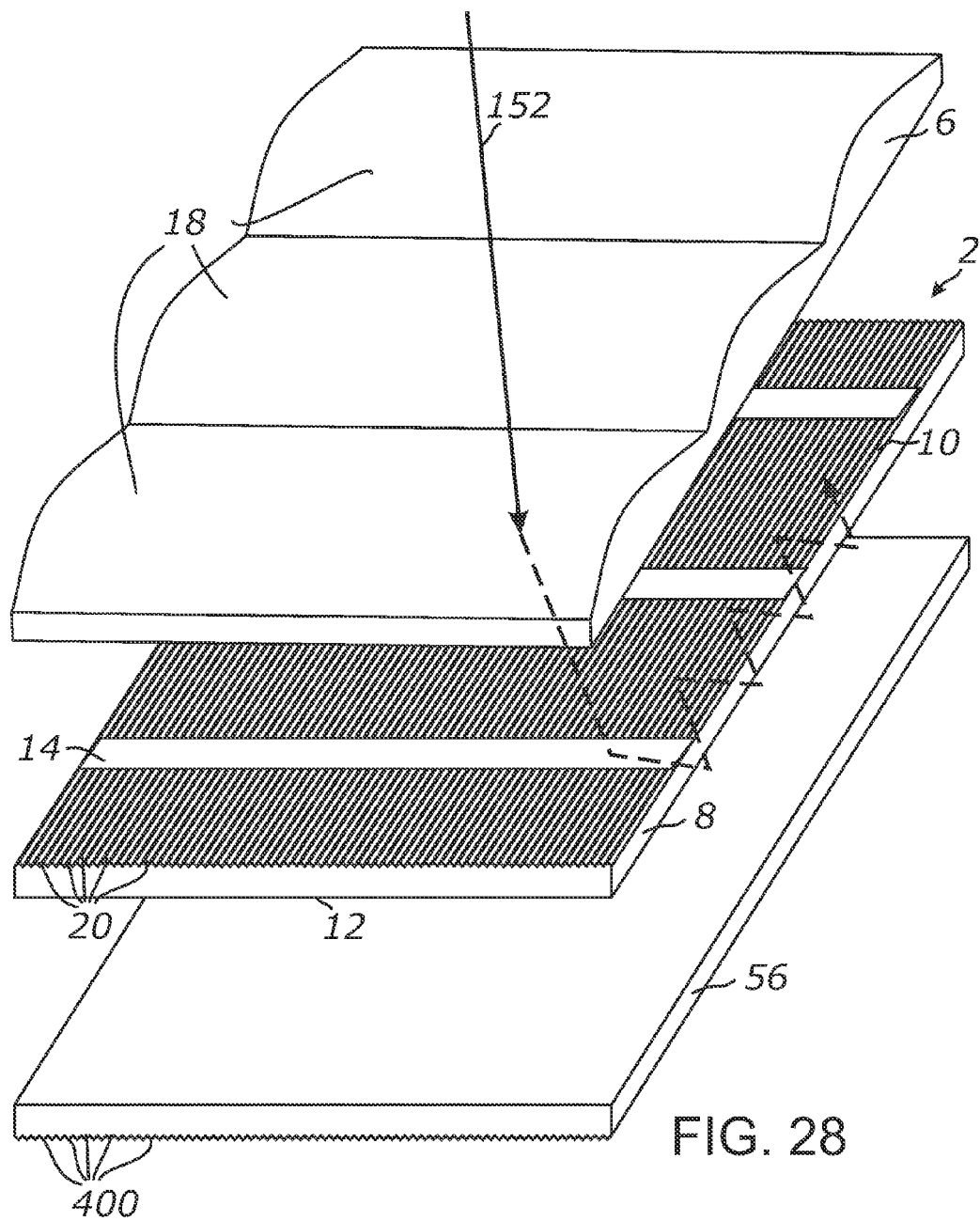
FIG. 28 is schematic expanded view of an optical cover in an alternative waveguide configuration, according to at least one embodiment of the present invention.

In FIG. 28, an expanded perspective view of an embodiment of optical cover 2 is depicted. Cover 2 comprises a lens array 6 which is shaped as a thin sheet or film of a transparent material and employs a plurality of cylindrical imaging lenses 18. Transparent layer 8 having corrugated top surface 10 is disposed underneath lens array 6 and employs a plurality of elongated optical windows 14. Windows 14 are arranged into parallel bands extending perpendicular to corrugations 20 and parallel to the longitudinal of lenses 18. Each window 14 is further vertically aligned with an optical axis of respective lens 18 or lens array 6 so that each pair of lens 18 and window 14 forms an individual opticule.

A transparent layer 56 having the same form factor as layer 8 is disposed below layer 8 at a predefined spacing distance. Layer 56 has corrugations 400 on its planar surface which is facing away from layer 8. Similarly to corrugations 20 of surface 10, corrugations 400 may also be formed by isosceles right-angle prisms extending parallel to each other and generally parallel to the longitudinal axis of corrugations 20. The pitch of the prisms of corrugations 400 may be the same or it may differ from the pitch of the prisms forming corrugations 20.

The entrance aperture of each optical window 14 is selected to be substantially smaller than that of the respective lens 18. Particularly, the width of each strip of optical windows 14 should be smaller, in a transversal cross-section, than the width of individual lenses 18 in the same cross-section.

In operation, lens array 6 focuses the incident light onto the plurality of optical windows 14 which, in turn, inject said light into layer 8 so that it subsequently becomes trapped between layers 8 and 56 by means of TIR retroreflection from corrugations 20 and 400. Particularly, ray 152 exemplifying the incident light strikes an individual lens 18 of lens array 6 and is directed towards the respective optical window 14. Window 14 transmits ray 152 into layer 8 at a sufficiently low refraction angle in the plane perpendicular to the longitudinal axis of corrugations 20. The refraction angle should be particularly lower than the minimum incidence angle that a ray can make in the above plane with respect to the plane of surface 10 so as to result in being retroreflected from corrugations 20.

Layer 8, being essentially transparent to the incident light, passes ray 152 downward to layer 56 where the light is reflected from corrugations 400 by TIR and sent back to layer 8. The corrugations 20 of layer 8 further reflect ray 152 by means of TIR so that this process can continue while the light can be transported along the structure formed by layers 8 and 56 toward a predetermined location within the structure or toward a terminal edge of the structure. It should be understood that, when practical, layer 56 may be configured for specular reflection and employ a mirrored layer or surface in addition or instead of corrugations 400. In further variations of the embodiment shown in FIG. 28, a light harvesting device or any suitable photoabsorptive layer may be provided between layers 8 and 56 in order to utilize light trapped between the layers.

Figure 29:
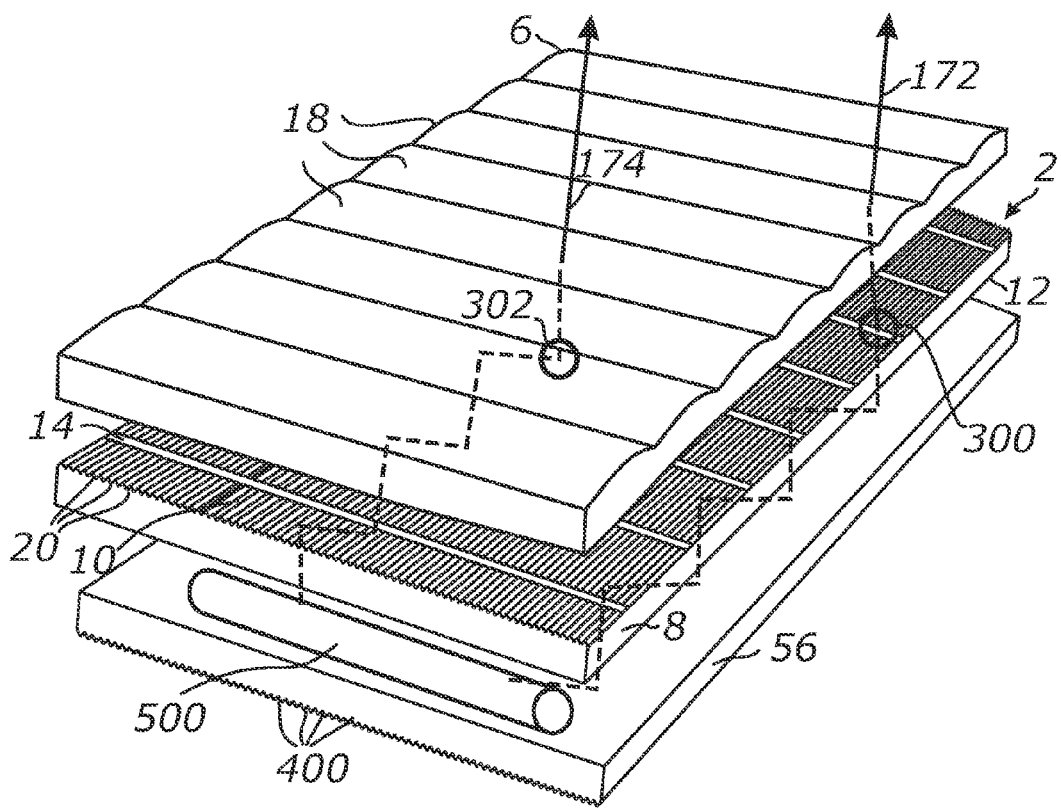
FIG. 29 is a schematic expanded view of a further embodiment of the present invention illustrating light distribution and collimation function of an optical cover.

FIG. 29 depicts an embodiment of optical cover 2 employed for confining and distributing light within a collimating luminaire having the shape of a planar panel. Lens array 6 comprising cylindrical lenses 18 is disposed above corrugated surface 10 of transparent layer 8. Corrugated surface 10 comprises a plurality of isosceles right-angle corrugations 20 aligned along a predetermined axis which may be advantageously selected to be generally parallel to the prevailing direction of light propagation within the panel. Surface 10 further has a plurality of optical windows 14 each having a linear aperture with the longitudinal axis being generally perpendicular to that of corrugations 20. Lens array 6 may be positioned immediately adjacent to surface 10 or at a relatively small distance from it to form a layered configuration. Layer 56 of an optically transparent material is provided on the bottom of the panel and is spaced apart from layer 8 by a predetermined distance. Layer 56 has isosceles right-angle corrugations 400 disposed on the surface facing away from layer 8. Alternatively, said surface of layer 56 can be mirrored to provide for a specular reflection. Each pair of lens 18 and optical window 14 disposed in the lens's focus forms an individual opticule that is capable of coupling or decoupling light to or from layer 8 depending on the direction of light propagation with respect to a normal to surface 10. Light source 500 may include one or more illumination sources of any known type, including but not limited to light emitting diodes (LEDs), compact fluorescent lamp (CFLs), cold-cathode fluorescent lamp (CCFLs), incandescent lamp (e.g., filament lamps, halogen lamps), fluorescent lamps, phosphorescent sources, high-intensity discharge lamps (e.g., sodium vapor, mercury vapor, and metal halide), carbon arc lamps, etc.

In operation, ray 172 emanated by a tubular light source 500 propagates between layers 8 and 56 by bouncing from corrugations 20 and 400 of the respective layers due to TIR until it encounters optical window 14 at a point indicated by the encircled area 300. Optical window 14 alters the optical properties of surface 10 in such a way that it suppresses TIR within the local area of its active aperture. As a result, ray 172 exits from layer 8 by passing through surface 10. Since optical window 14 is disposed in the focus of respective lens 18, the lens can intercept ray 172 and collimate it into a direction generally perpendicular, in at least one cross-section, to the prevailing plane of optical cover 2. Similarly, ray 174 emanated by source 500 propagates between layers 8 and 56 by means of at least TIR from corrugations 20 and 400 until it is ejected by optical window 14 at a point indicated by the encircled area 302. Accordingly, due to the random distribution of rays emitted by source 500, various rays will be ejected, with collimation, from different areas of the surface of optical cover 2. The placement of individual opticules can be selected to provide a relatively uniform collimated beam from the entire surface of optical cover 2 or from its predetermined portions.

It should be understood that optical cover 2 may include any additional layers, such as those conventionally used for optical cladding, separation between other layers, protection from the environment, etc. Such layers may be conventionally laminated or otherwise deposited onto any layer or component of cover 2 to form an integral monolithic structure or may also be provided as separate pieces externally attached to cover 2 or inserted between its any other layers.

Any of the surfaces employed in optical cover 2, especially those contacting with air may be provided with a layer of anti-reflective coating in order to reduce the Fresnel reflections when the light refracts through the surface and thus enhance the light transmission of the system. Alternatively, or in addition to this, an anti-reflective layer can be embedded at any suitable part of cover 2, e.g. between any of its layers to further promote the transmissivity and overall system efficiency. Common anti-reflective coatings such as $TiO_2$ deposited by Atmospheric Pressure Chemical Vapor Deposition (APCVD) and $Si_3N_4$ deposited by Plasma Enhanced Chemical Vapor Deposition (PECVD) may be used, for example.

Figure 30:
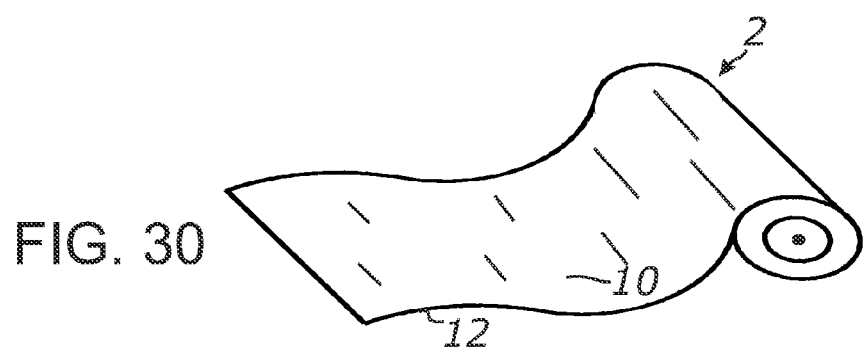
FIG. 30 is a schematic view of an optical cover in a sheet roll form, according to at least one embodiment of the present invention.

It should be understood that optical cover 2 is not limited to the planar shape or rigid structures. As illustrated in FIG. 30, the fabricated optical cover 2, including any of its components, such as, for example, layer 8 and/or lens array 6, may have a form of a flexible sheet or film and can be stored or supplied in rolls. Furthermore, it may be bent to any suitable shape, such as, for example, a cylindrical shape, depending on the application.

Further details of operation of optical cover 2 shown in the drawing figures as well as its possible variations will be apparent from the foregoing description of preferred embodiments. Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An optical cover, comprising:
   a generally planar layer of optically transparent material having at least one broad corrugated surface, said corrugated surface including highly transparent optical windows distributed according to a predetermined pattern and configured for communicating light to or from said layer;
      wherein the corrugations of said corrugated surface are aligned parallel to a reference line and configured to retroreflect at least some light propagating in said layer by means of a total internal reflection.

2. An optical cover as recited in claim 1, wherein said corrugations are formed by isosceles right-angle prisms.

3. An optical cover as recited in claim 1, wherein each of said optical windows has at least one surface portion being generally parallel to a prevailing plane of said layer.

4. An optical cover as recited in claim 1, wherein said optical windows are arranged into parallel strips extending generally perpendicular to said reference line.

5. An optical cover as recited in claim 1, wherein said optical windows are formed by discrete openings in said corrugations.

6. An optical cover as recited in claim 1, wherein each of said optical windows includes one or more refractive faces inclined at an angle with respect to a prevailing plane of said layer at least in a cross-section perpendicular to said reference line.

7. An optical cover as recited in claim 1, wherein said optical windows comprise surface relief features selected from the group of elements consisting of cavities, prismatic grooves, blind holes, through holes, undercuts, notches, extensions, surface discontinuities, discontinuities in said layer, surface texture, and surface corrugations.

8. An optical cover as recited in claim 1, wherein said optical windows comprise cavities having a V-shape in a cross-section.

9. An optical cover as recited in claim 1, further comprising a plurality of light collectors disposed in energy exchange relationship with said optical windows.

10. An optical cover as recited in claim 1, further comprising a lens array having a focal plane disposed in an immediate proximity of said corrugated surface.

11. An optical cover as recited in claim 1, further comprising a lens array wherein each lens in said array has a shape in a longitudinal section selected from the group of elements consisting of elongated, cylindrical, square, rectangular and hexagonal.

12. An optical cover as recited in claim 1, further comprising one or more light harvesting devices disposed on an opposing side of said layer with respect to said corrugated surface.

13. An optical cover as recited in claim 1, further comprising a light harvesting device, wherein said light harvesting device is selected from the group of elements consisting of one or more photovoltaic cells, radiation detectors, light absorbers, photo-chemical reactors and photo-bioreactors.

14. An optical cover as recited in claim 1, further comprising one or more light sources disposed below a prevailing plane of said layer with respect to said corrugated surface.

15. An optical cover as recited in claim 1, further comprising one or more reflective surfaces disposed below a prevailing plane of said layer with respect to said corrugated surface.

16. An optical cover as recited in claim 1, further comprising a reflective surface disposed below a prevailing plane of said layer with respect to said corrugated surface, wherein said reflective surface comprises isosceles surface corrugations extending parallel to said reference line.

17. An optical cover as recited in claim 1, further comprising a mirrored surface disposed below a prevailing plane of said layer with respect to said corrugated surface.

18. An optical cover as recited in claim 1 having a form of a flexible sheet or film.

19. An optical article, comprising:
   a layer of optically transparent material having at least one broad corrugated surface, said corrugated surface being formed by right-angle isosceles corrugations having retroreflective properties at least in one plane;
   wherein said corrugations include one or more openings configured for unimpeded communication of light into or from said layer.

* * * * *